(12) United States Patent
Nakai et al.

(10) Patent No.: US 7,738,784 B2
(45) Date of Patent: Jun. 15, 2010

(54) IMAGE CAPTURE DEVICE WITH AUTOMATIC FOCUSING FUNCTION

(75) Inventors: Takao Nakai, Fussa (JP); Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/247,918

(22) Filed: Oct. 8, 2008

(65) Prior Publication Data
US 2009/0041444 A1   Feb. 12, 2009

Related U.S. Application Data

(62) Division of application No. 11/341,019, filed on Jan. 26, 2006, now Pat. No. 7,515,820.

(30) Foreign Application Priority Data

| Jan. 28, 2005 | (JP) | ............................. 2005-021767 |
| Feb. 17, 2005 | (JP) | ............................. 2005-040200 |
| Nov. 17, 2005 | (JP) | ............................. 2005-332394 |

(51) Int. Cl.
   *G03B 17/00*   (2006.01)
(52) U.S. Cl. .................................... 396/263
(58) Field of Classification Search ................... 396/48, 396/89, 102, 125, 127, 133, 135, 136, 263; 348/345, 349, 350, 357; 359/694, 696, 697
See application file for complete search history.

(56) References Cited

U.S. PATENT DOCUMENTS 5,751,354 A   5/1998   Suzuki et al.

(Continued)

FOREIGN PATENT DOCUMENTS

JP   54-126026 A   9/1979

(Continued)

OTHER PUBLICATIONS

Japanese Office Action dated Jul. 21, 2009 and English translation thereof issued in a counterpart—Application No. 2005-332394.

(Continued)

*Primary Examiner*—Melissa J Koval
*Assistant Examiner*—Autumn Parker
(74) *Attorney, Agent, or Firm*—Frishauf, Holtz, Goodman & Chick, P.C.

(57) ABSTRACT

In an image capture device comprising an image capture unit which captures an object and outputs image data, and a shutter button which is half pressable, fully pressable, and pressable at one stroke, a first determining unit determines whether the shutter button is half pressed, and a second determining unit which determines whether the shutter button is pressed at one stroke. When the first determining unit determines that the shutter button is half pressed, a first capture control unit executes a first capture process for recording the image data, and when the second determining unit determines that the shutter button is pressed at one stroke, a stop control unit stops the first capture process, and a second capture control unit executes a second capture process which differs from the first capture process after the first capture process is stopped by the stop control unit.

4 Claims, 19 Drawing Sheets

U.S. PATENT DOCUMENTS

| | | |
|---|---|---|
| 2003/0012568 A1 | 1/2003 | Ishikawa et al. |
| 2003/0175022 A1* | 9/2003 | Ueyama .................. 396/89 |
| 2004/0130648 A1 | 7/2004 | Kikuchi et al. |
| 2005/0012846 A1 | 1/2005 | Shinohara |
| 2005/0041136 A1 | 2/2005 | Miyata et al. |

FOREIGN PATENT DOCUMENTS

| | | |
|---|---|---|
| JP | 2002-258344 A | 9/2002 |
| JP | 2002-287012 A | 10/2002 |
| JP | 2003-348437 A | 12/2003 |
| JP | 2004-070113 A | 3/2004 |
| JP | 2004-85697 A | 3/2004 |
| JP | 2004-085964 A | 3/2004 |
| JP | 2005-024895 A | 1/2005 |
| KR | 1994-0000771 B1 | 1/1994 |
| KR | 2002-061920 A | 7/2002 |
| WO | WO 2004/021064 A1 | 3/2004 |
| WO | WO 2005/013606 A2 | 2/2005 |

OTHER PUBLICATIONS

Japanese Office Action dated Dec. 22, 2009 and English translation thereof issued in a counterpart Japanese Application No. 2005-332394.

* cited by examiner

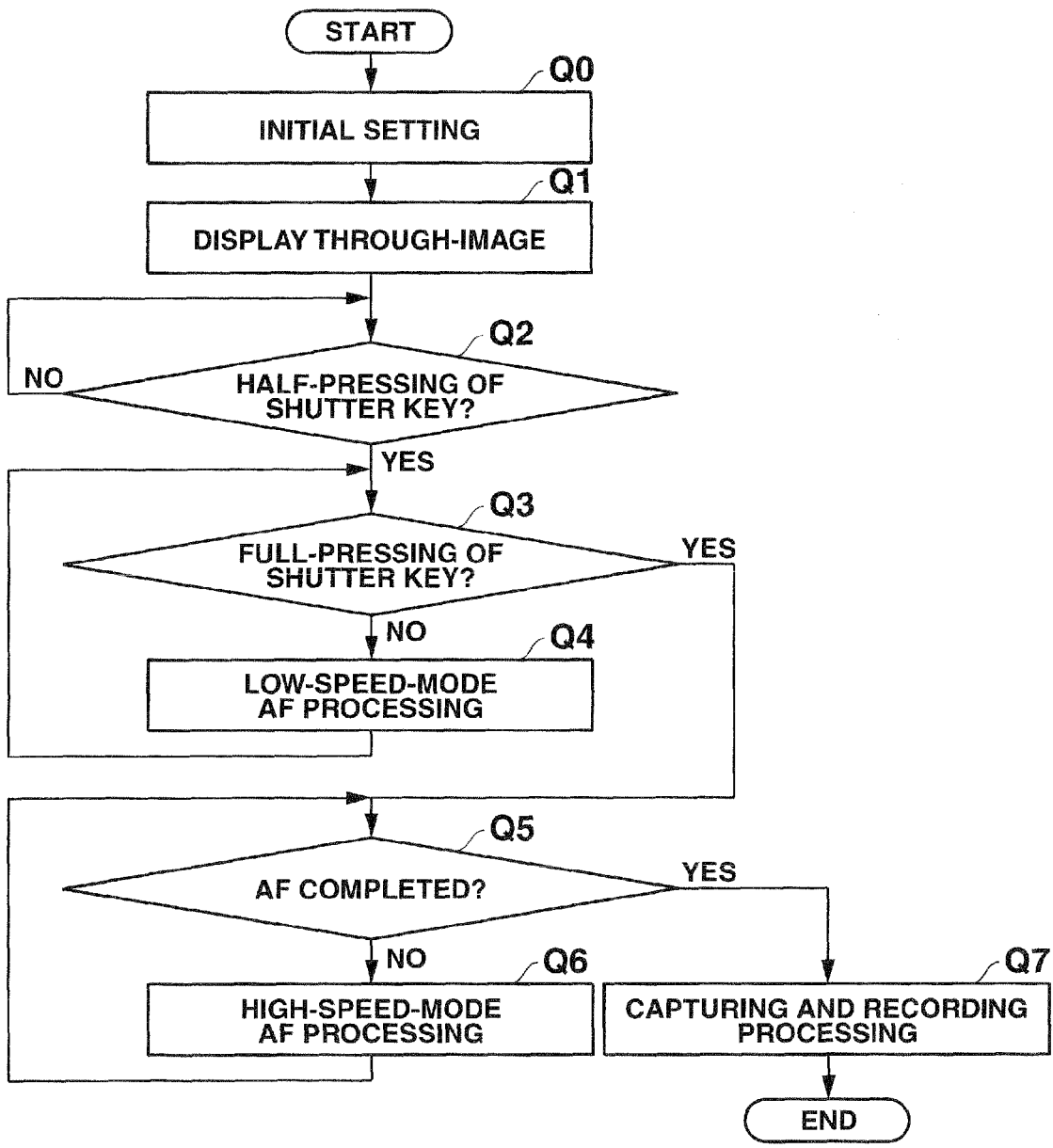

FIG.6

|  | LOW-SPEED-MODE AF | HIGH-SPEED-MODE AF |
| --- | --- | --- |
| FIRST EMBODIMENT (Z) | MOVING AMOUNT OF FOCUS LENS FOR ONE FRAME IS DECREASED | MOVING AMOUNT OF FOCUS LENS FOR ONE FRAME IS INCREASED |
| FIRST MODIFIED EXAMPLE (H1) | SET MOVING SPEED OF FOCUS LENS AS V1 | SET MOVING SPEED OF FOCUS LENS AS V2 (V2>V1) |
| SECOND MODIFIED EXAMPLE (H2) | DISPLAY THROUGH-IMAGE EVEN DURING AF PROCESSING | INTERRUPT THROUGH-IMAGE DISPLAY DURING AF PROCESSING AND PERFORM AF PROCESSING WITH HIGHER FRAME RATE |
| THIRD MODIFIED EXAMPLE (H3) | PERFORM AF PROCESSING WITH TWO-STAGE SEARCHING: ROUGH-SEARCHING AND DETAILED SEARCHING | PERFORM AF PROCESSING WITH ONLY ROUGH SEARCHING |
| FOURTH MODIFIED EXAMPLE (H4) | MAKE EXPOSURE TIME FOR AF FOR ONE FRAME LONGER | MAKE EXPOSURE TIME FOR AF FOR ONE FRAME SHORTER |
| FIFTH MODIFIED EXAMPLE (H5) | MAKE MOVING RANGE OF LENS WIDER | MAKE MOVING RANGE OF LENS SHORTER |

FIG.7

| COMBINATIONS OF TWO EMBODIMENTS/ EXAMPLES |
| --- |
| H1, Z |
| H4, Z |
| H5, Z |
| H2, H1 |
| H3, H1 |
| H4, H1 |
| H5, H1 |
| H4, H3 |
| H5, H3 |
| H5, H4 |

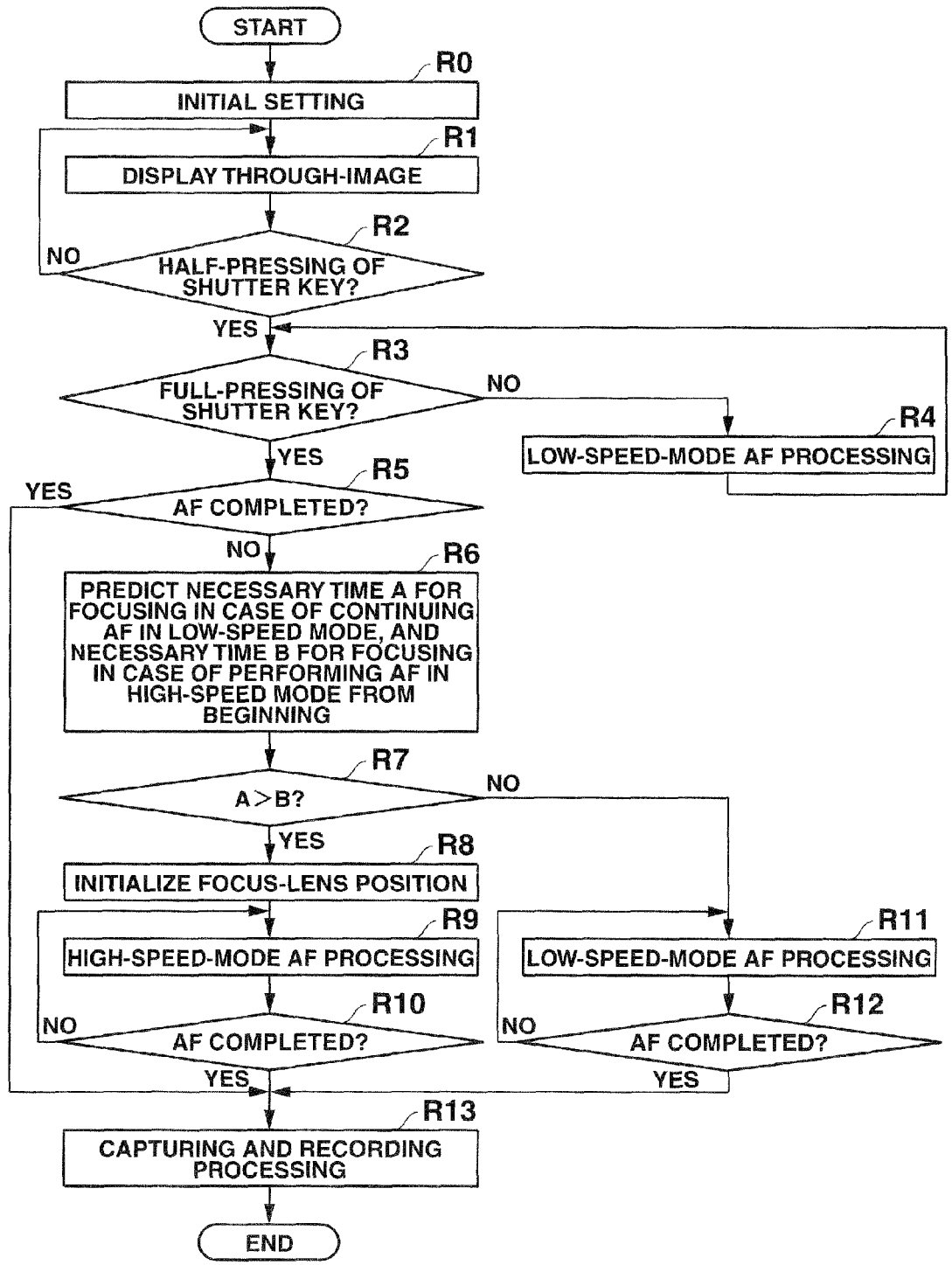

IMAGE CAPTURE DEVICE WITH AUTOMATIC FOCUSING FUNCTION

CROSS-REFERENCE TO RELATED APPLICATIONS

The present application is a Divisional application of U.S. application Ser. No. 11/341,019 filed Jan. 26, 2006 now U.S. Pat. No. 7,515,820, which is based upon and claims the benefit of priority from prior Japanese Patent Applications No. 2005-021767, filed Jan. 28, 2005; No. 2005-040200, filed Feb. 17, 2005; and No. 2005-332394, filed Nov. 17, 2005, the entire contents of all of which are incorporated herein by reference.

BACKGROUND OF THE INVENTION

1. Field of the Invention

The present invention relates to an image capture device which can be used for a digital camera, and is provided with an automatic-focusing function and to a method for automatic-focusing control.

2. Description of the Related Art

Conventionally, a digital still camera (hereinafter, called a digital camera) provided with an automatic-focusing function according to an automatic focusing (AF) method of a contrast detection type has been known.

The digital camera provided with an automatic-focusing function extracts a high frequency component by using a high pass filter after necessary preprocessing of image data for a subject image formed with a lens unit when a shutter button is half pressed. Then, image formation can be realized at the best focus position by driving the lens unit and adjusting a focus position in such a way that the high frequency component of the whole data is a maximum value.

According to a method for detecting a focus position in such a way that the high frequency component is the maximum value, it is determined, by the above-described processing of the image data at a necessary interval while the focus position is changed from infinite distance to this side by driving the lens unit, whether or not the high frequency component is the maximum value. Then, the image data of the subject image is recorded, wherein the subject image has been captured at the best focus position by finally driving the lens unit to a focus position at which the high frequency component is the maximum value, and by full-pressing of the shutter button under a state that the high frequency component is the maximum value.

Even when the shutter button is fully pressed at one stroke, a half-pressed state is always passed to start focusing adjustment, the subject image is captured at the best focus position, and the image data for the subject image is recorded.

However, a conventional digital camera provided with an automatic-focusing function according to an AF method of a contrast detection type requires image data processing and driving control of a lens unit for determining an appropriate lens position at which a subject is in focus, as described above. Accordingly, there have been problems: a problem that the shutter is not released at the right moment because there is necessary time between time at which a camera user catches a subject in a finder and time at which the subject is in focus and a shutter button is fully pressed for image forming; and a problem that a subject image with some lag between a full-pressing point and a point at which an image captured by the camera user might be obtained is recorded even when the shutter button is fully pressed at one stroke because the recorded image is an image which has been formed when the image is in the best focus.

In order to solve the above-described problems, there has been disclosed an image capture device (refer to, for example, Jpn. Pat. Appln. KOKAI Publication No. 2004-085697 (Patent Document 1)) for capturing a subject image in a state in which the shutter is released at the right moment and the time lag is eliminated, thereby recording the subject image. According to the above image capture device, it is discriminated, when an image is captured, whether an interrupt processing flag is ON or OFF. When a shutter button is "half pressed", the interrupt processing flag is set to be ON, and it is determined whether or not there is a "fully pressed" signal from the shutter button. When the shutter button is "fully pressed" at one stroke, the determination is assumed to be YES. Accordingly, a charge coupled device (CCD) outputs image data for exposure, and the image data for exposure is separated to a luminance signal and a color difference signal in a color processor. A central processing unit (CPU) stores the separated luminance signal and color difference signal into a RAM. Consequently, image data, which is obtained when the shutter button is fully pressed before focusing is completed, is configured to be stored in the RAM.

Moreover, there is an advantage that time for detecting a focused position can be reduced in driving control of a lens unit when the driving speed of the focus lens is increased, but there is a disadvantage that it is difficult to accurately stop the focus lens at a focused position. There has been a technology (refer to, for example, Jpn. Pat. Appln. KOKAI Publication No. 2002-287012 (Patent Document 2)) which brings the above-described advantage and the above-described disadvantage into harmony with each other, based on the above-described viewpoint, by changing the driving speed of the focus lens according to situations and by detecting the focused position.

According to the patent document 2, when a release button (shutter key) is half pressed, low-speed driving of the focus lens is started, and subsequently, a difference between the current position of the focus lens and a focused position is measured. If the measured value is smaller than a predetermined value, the focus lens is driven at a low speed with no change in the speed. If the measured value is smaller than the predetermined value, time for detecting the focused position is shortened by driving the focus lens at a high speed.

BRIEF SUMMARY OF THE INVENTION

An object of the present invention is to provide an image capture device and a control method for automatic focusing, by which an image with good focusing accuracy can be obtained with right-time firing of the shutter and without generating time lag.

According to an embodiment of the present invention, an image capture device comprises:

automatic-focusing means for comparing contrast values of captured images which are sequentially obtained through an image capture element while moving a focus lens and for detecting a focused lens position of the focus lens based on results of comparisons;

a shutter button which is able to be half pressed and fully pressed;

first determining means for determining whether or not the shutter button is half pressed;

second determining means for determining whether or not the shutter button is fully pressed;

first automatic-focus control means for, when the first determining means determines that the shutter button is half pressed, executing a first automatic-focusing processing by using the automatic-focusing means; and second automatic-focus control means for, when the second determining means determines that the shutter button is fully pressed, executing a second automatic-focusing processing with higher processing speed than that of the first automatic-focusing processing by using the automatic-focusing means.

According to an embodiment of the present invention, an image capture device comprises:

capturing means for capturing a subject image;

automatic exposure means for setting an appropriate exposure value for the capturing means;

a shutter button which is able to be half pressed and fully pressed;

first determining means for determining whether or not the shutter button is half pressed;

second determining means for determining whether or not the shutter button is fully pressed;

first automatic-exposure control means for, when the first determining means determines that the shutter button is half pressed, controlling the automatic exposure means to execute a first automatic-exposure processing; and second automatic-exposure control means for, when the second determining means determines that the shutter button is fully pressed, controlling the automatic exposure means to execute a second automatic-exposure processing which is simpler than the first automatic-exposure processing.

According to an embodiment of the present invention, an image capture device comprises:

capturing means for capturing a subject image;

automatic white balance means for setting an appropriate white balance value for the capturing means;

a shutter button which is able to be half pressed and fully pressed;

first determining means for determining whether or not the shutter button is half pressed;

second determining means for determining whether or not the shutter button is fully pressed;

first automatic white balance control means for, when the first determining means determines that the shutter button is half pressed, controlling the automatic white balance means to execute a first automatic white balance processing; and second automatic white balance control means for, when the second determining means determines that the shutter button is fully pressed, controlling the automatic white balance means to execute a second automatic white balance processing which is simpler than the first automatic white balance processing.

According to an embodiment of the present invention, an image capture device comprises:

capturing means for capturing a subject image;

stroboscopic light charging means for executing stroboscopic light charging for a stroboscopic-light unit;

stroboscopic light-emitting means for emitting a stroboscopic light by using the stroboscopic-light unit charged by the stroboscopic light charging means;

a shutter button;

first determining means for determining whether or not the shutter button is operated; and capturing control means for, when the first determining means determines that the shutter button is operated, controlling the capturing means to execute capturing regardless of whether or not a stroboscopic light charging is executed by the stroboscopic light charging means.

According to an embodiment of the present invention, an image capture device comprises:

capturing means for capturing a subject image;

automatic exposure means for setting an appropriate exposure value for the capturing means;

a shutter button;

first determining means for determining whether or not the shutter button is operated; and capturing control means for, when the first determining means determines that the shutter button is operated, controlling the capturing means to execute capturing regardless of whether or not automatic-exposure processing is executed by the automatic exposure means.

According to an embodiment of the present invention, an image capture device comprises:

capturing means for capturing a subject image;

automatic white balance means for setting an appropriate white balance value for the capturing means;

a shutter button;

first determining means for determining whether or not the shutter button is operated; and capturing control means for, when the first determining means determines that the shutter button is operated, controlling the capturing means to execute capturing, regardless of whether or not automatic white balance processing is executed by the automatic white balance means.

According to an embodiment of the present invention, an image capture method comprises:

determining whether or not a shutter button, which is able to be half pressed and fully pressed, is fully pressed; and executing a second automatic-focusing processing when it is determined that the shutter button is fully pressed, a processing speed of the second automatic-focusing processing being faster than a processing speed of a first automatic-focusing processing which is to be executed when it is determined that the shutter button is half pressed.

According to an embodiment of the present invention, an article of manufacture comprising a computer usable medium having computer readable program code means embodied therein, the computer readable program code means comprises:

computer readable program code means for causing a computer to determine whether or not a shutter button, which is able to be half pressed and fully pressed, is half pressed;

computer readable program code means for causing a computer to determine whether or not the shutter button is fully pressed;

computer readable program code means for causing a computer to execute a first automatic-focusing processing when it is determined that the shutter button is half pressed;

computer readable program code means for causing a computer to execute a second automatic-focusing processing when it is determined that the shutter button is fully pressed, a processing speed of the second automatic-focusing processing being faster than a processing speed of the first automatic-focusing processing.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 5 is a flowchart showing an outline of AF operations at switching between AF processing in low-speed mode and AF processing in high-speed mode;

FIG. 6 is a view explaining the first embodiment, and five modified examples of the first embodiment;

FIG. 7 is a view showing combination examples of AF processing in low-speed mode and AF processing in high-speed mode;

FIG. 12 is a flowchart showing the content of concrete operations for the digital camera according to the second embodiment;

DETAILED DESCRIPTION OF THE INVENTION

An embodiment of the present invention will now be described with reference to the accompanying drawings. Configurations of a digital camera 1 according to first and second embodiments of the invention will be first explained.

First Embodiment

Figure 1:
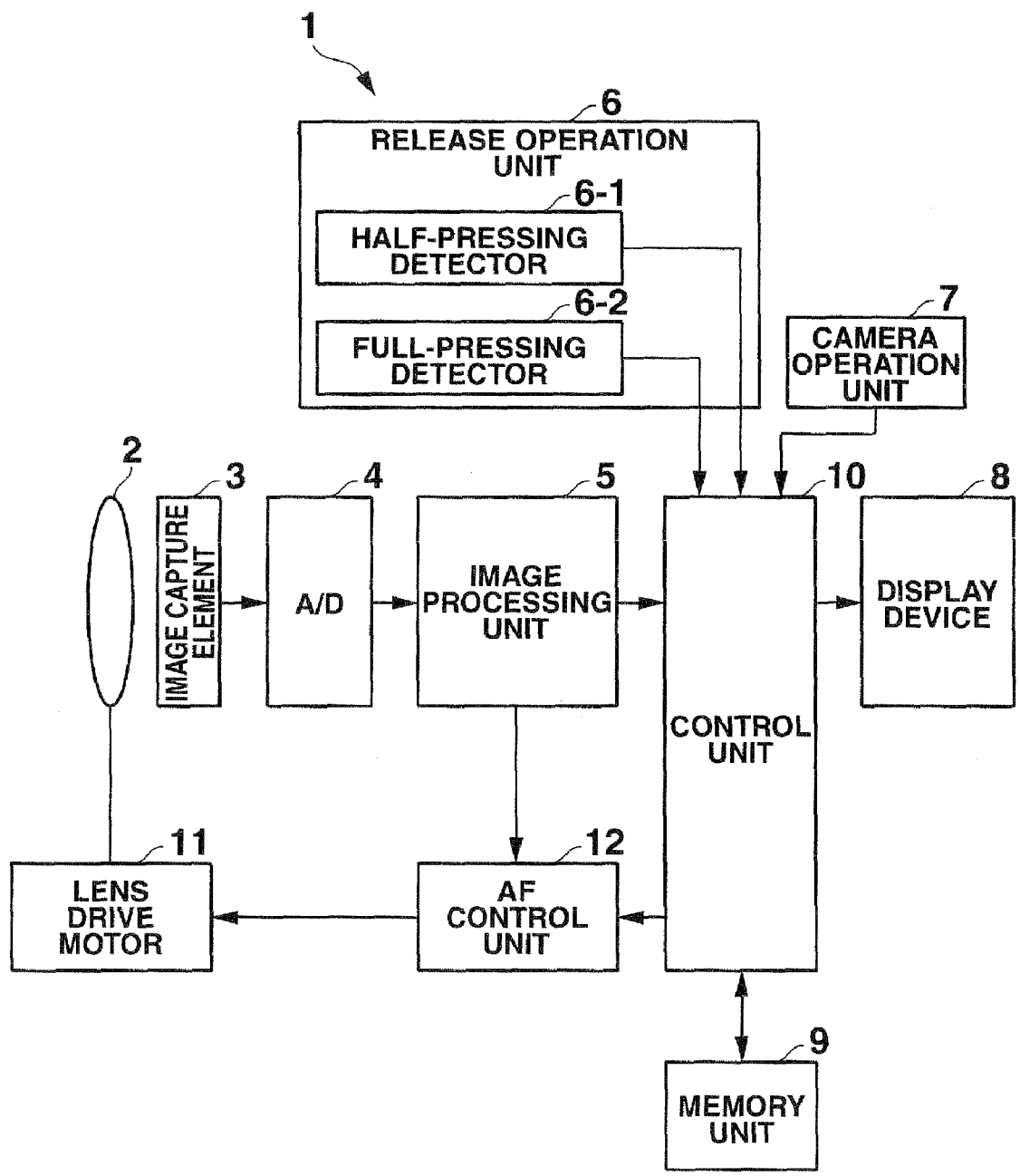
FIG. 1 is a block diagram showing a configuration example of a digital camera according to first and second embodiments of the present invention.

As shown in FIG. 1, the digital camera 1 is provided with an automatic focus-adjusting function (AF function), and comprises an optical lens system 2; an image capture element 3; an analog-digital (A/D) converter 4; an image processing unit 5; a release operation unit 6; a camera operation unit 7; a display device 8; a memory unit 9; a control unit 10; a lens driving motor unit 11; and an AF control unit 12.

The optical lens system 2 comprises an image capture lens, a focus lens for focusing, a stop mechanism for adjusting an amount of light incident on the image capture element 3, and the like. An optical image of a subject (subject image) focused through the optical lens system 2 is formed on the image capture element 3.

The image capture element 3 is, for example, a CCD, and accumulates a subject image focused through the optical lens system 2 after converting the image into charges with a large capacity corresponding to the brightness of the image. Then, the image capture element 3 outputs the accumulated charges as an image signal (analog signal) by scanning drive with a timing generator and a vertical (V) driver which are not shown.

The image signal output from the image capture element 3 is amplified through an automatic gain control (AGC) amplifier (not shown) after noises on the signal are removed in a correlation double sampling (CDS) circuit (not shown), and the signal is converted into a digital signal in the analog-digital (A/D) converter 4.

The image processing unit 5 comprises a color processing circuit, a direct memory access (DMA) controller, and the like (not shown). The image processing unit 5 performs color processing of the image signal in digital form, which is supplied from the A/D converter 4, in the color processing circuit to generate a luminance signal Y, color difference signals Cb, and Cr.

Subsequently, the image processing unit 5 performs DMA transfer of the luminance signal Y and the color difference signals Cb, and Cr generated in the color processing circuit to a dynamic random access memory (DRAM) in the memory unit 9 by using the DMA controller. Moreover, the luminance signal Y generated in the color processing circuit is also supplied to the AF control unit 12.

The release operation unit 6 is provided with a half-press detector 6-1 and a full-pressing detector 6-2. Assuming that the half-press is completed, a signal (half-press detection signal) to that effect is supplied to the control unit 10 when a shutter key is depressed by a user, and the half-press detector 6-1 detects that the key reaches a predetermined midpoint point. Then, assuming that the full-pressing is completed, a signal (full-press detection signal) to that effect is supplied to the control unit 10 when the full-pressing detector 6 detects that the shutter key reaches a lowest point.

The camera operation unit 7 includes various kinds of operation keys such as a power-on key and a mode switching key for switching between a capturing mode and a reproduction mode, and the unit 7 supplies a detection signal according to key operation to the control unit 10.

The display device 8 comprises, for example, a liquid crystal display (LCD), and displays a through-image, a captured image, a reproduced image, and the like based on a video signal supplied from the control unit 10.

The memory unit 9 comprises a DRAM, a video random access memory (VRAM), a secure digital memory card (SD), and the like.

The control unit 10 comprises, for example, a CPU, a read only memory (ROM), and a random access memory (RAM) (not shown), and controls the operation of each part of the digital camera 1 according to various kinds of programs which are stored in the ROM and the like and are appropriately executed by the CPU. Here, the RAM is used as a work memory when the programs are executed by the CPU.

The control unit 10 reads the luminance signal Y, and the color difference signals Cb and Cr, which have been obtained from the DMA controller through DMA transfer, and writes the read signals into a VRAM. Subsequently, the control unit 10 periodically reads the luminance signal Y and the color difference signals Cb and Cr from the VRAM, and generates a video signal. Then, the video signal is supplied to the display device 8. Thereby, a through-image is displayed on the display device 8.

The lens driving motor unit 11 comprises, for example, a stepping motor, and moves the focus lens in the direction of an optical axis by stepping drive according to stepping drive instructions and instructions for normal-reverse rotation of the motor, which are supplied from the AF control unit 12.

The AF control unit 12 performs focusing by stepping drive of the lens driving motor unit 11, based on the luminance signal supplied from the image processing unit 5 and by adjusting the position of the focus lens in predetermined steps.

Figure 2:
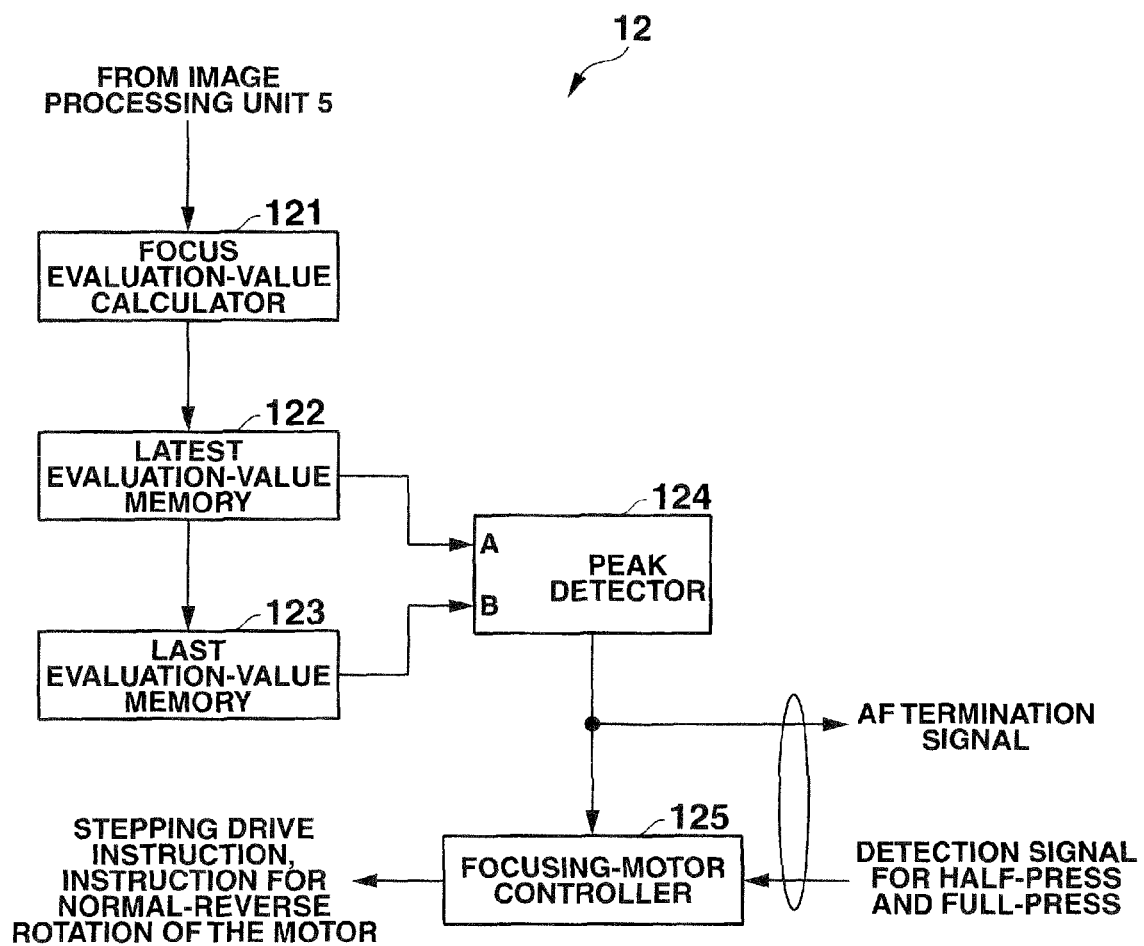
FIG. 2 is a block diagram showing a configuration example of an AF control unit shown in FIG. 1.

FIG. 2 is a block diagram showing a configuration example of the AF control unit 12. As shown in FIG. 2, the AF control unit 12 comprises a focus evaluation-value calculator 121; a latest evaluation-value memory 122; a last evaluation-value memory 123; a peak detector 124; and a focusing-motor controller 125.

The focus evaluation-value calculator 121 comprises a high pass filter, an integrator, and the like (not shown), and extracts the high frequency component of the luminance signal Y which is supplied from the image processing unit 5, by using the high pass filter. Then, the focus evaluation-value calculator 121 integrates the high frequency component of the luminance signal Y, which has been extracted with the high pass filter, and the integrated value (a value denoting contrast), which has been obtained as described above, is acquired as an AF evaluation value.

The latest evaluation-value memory 122 stores the latest AF evaluation value (the latest evaluation value) A, which has been acquired in the focus evaluation-value calculator 121, and the last evaluation-value memory 123 stores the AF evaluation value (the last evaluation value) B which has been acquired in the last processing.

The peak detector 124 compares the latest evaluation value A stored in the latest evaluation-value memory 122, and the last evaluation value B stored in the last evaluation-value memory 123, and detects the peak of the AF evaluation values, that is, a focused position, based on the comparison result.

More specifically, when it is found from the comparison result that the latest evaluation value A is larger than the last evaluation value B, operation for detecting the peak is continued, assuming that the AF evaluation value has not reached the peak. When it is found from the result that the latest evaluation value A is smaller than the last evaluation value B, an AF termination signal instructing the focus lock is supplied to the focusing-motor controller 125 and the control unit 10, assuming that the AF evaluation value has reached the peak.

The focusing-motor controller 125 controls rotating operation of the lens driving motor unit 11, based on the full-press detection signal and the half-press detection signal, which are supplied from the release operation unit 6.

More specifically, when the half-press detection signal is supplied from the release operation unit 6, a pulse signal with a predetermined period including stepping drive instruction and the instruction for normal-reverse rotation of the motor is supplied to the lens driving motor unit 11. Then, the focus lens is moved from the side of near point to the side of infinite distance at the rate of a predetermined number of steps per unit period by stepping drive of the lens driving motor unit 11.

When the full-press detection signal is supplied from the release operation unit 6, a pulse signal with a period shorter than that of the case in which the half-press detection signal is supplied is supplied, whereby the rotational speed of the lens driving motor unit 11 is increased, and the number of steps by which the focus lens is moved during the unit period is increased. As described above, the moving speed of the focus lens at full-pressing of the shutter key can be increased in comparison with that at the half pressing of the shutter key.

Furthermore, when the AF termination signal is supplied from the peak detector 124, the focus lens is returned to the last position by reverse rotation of the lens driving motor unit 11 according to the supplied pulse signal including an instruction for reverse rotation of the motor by which rotation is instructed to be in the opposite direction to that of the case in which the full-pressing signal, or the half pressing signal is supplied. Thus, the focus lens is set at the focused position.

Subsequently, concrete operations of the digital camera with the above-described configuration will be explained.

Figure 3:
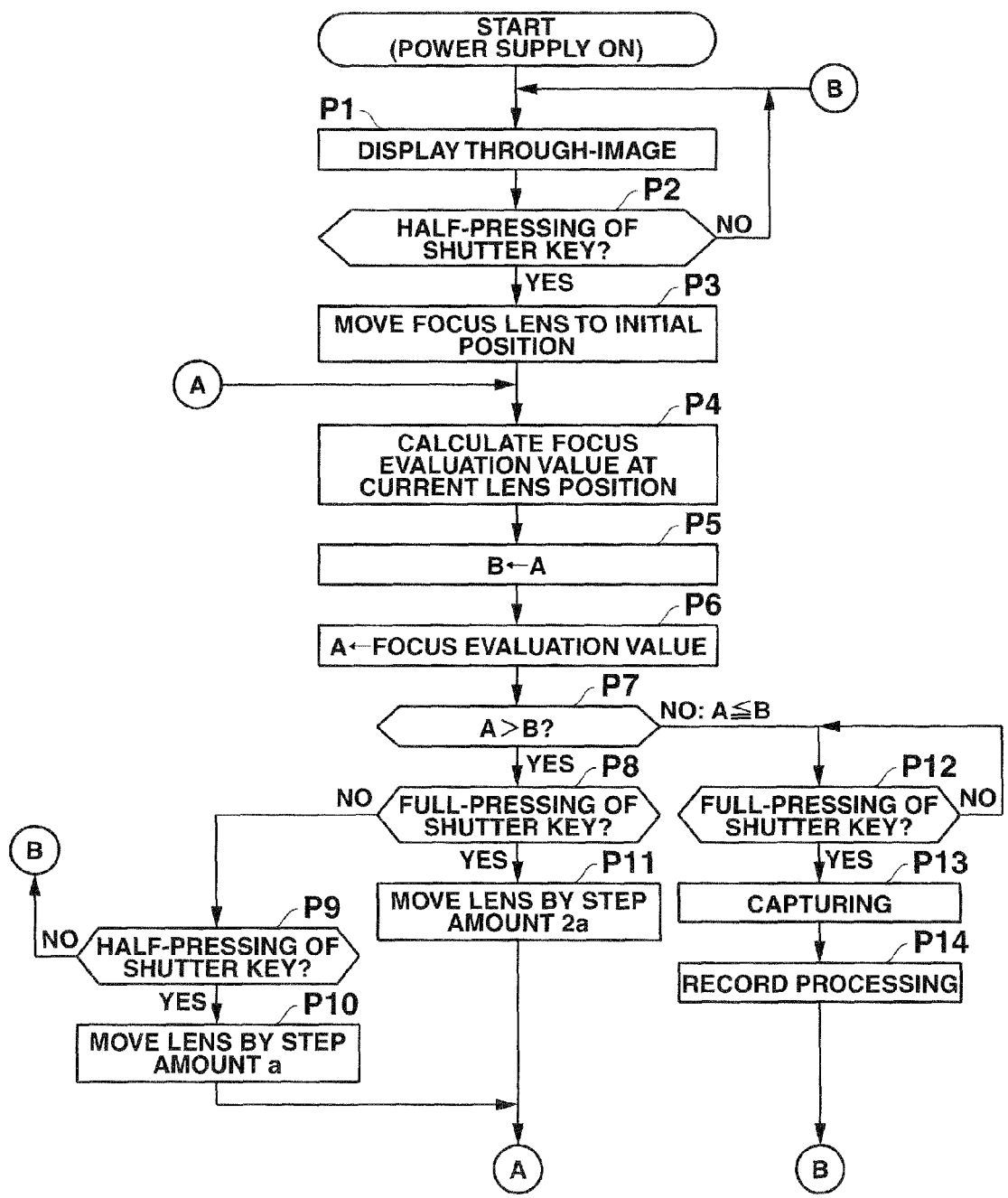
FIG. 3 is a flowchart showing the content of concrete operations for the digital camera according to the first embodiment.

FIG. 3 is a flowchart showing the concrete operations of the digital camera. When the power supply of the digital camera 1 is turned into the ON state, the control unit 10 executes necessary processing for initial setting such as resetting of the RAM, the DRAM, and the VRAM, and setting for on-board registers at first. In the processing for the initial setting, the digital camera 1 is set in a through mode, and a through-image is displayed on the display device 8 (step P1).

When the shutter key is half pressed by a user, and a half-press signal is supplied from the half-press detector 6-1 (YES in step P2), the AF control unit 12 starts automatic-focusing processing, and, the focusing-motor controller 125 controls the lens driving motor unit 11 to move the focus lens to an initial position (step P3). Here, the initial position is configured to be changed according to set capturing modes. Usually, the lens is moved to the nearest point for a normal mode; and to a position at the infinite distance for a macro mode.

Next, the AF control unit 12 calculates an AF evaluation value, based on a luminance signal Y supplied from the image processing unit 5, in the focus evaluation-value calculator 121 (step P4). Then, after the AF control unit 12 shifts the kept content of the latest evaluation-value memory 122 to the last evaluation-value memory 123 (step P5), the AF evaluation value calculated by processing in step P4 is stored into the last evaluation-value memory 123 (step P6).

Subsequently, the AF control unit 12 compares the latest evaluation value A stored in the latest evaluation-value memory 122 and the last evaluation value B stored in the last evaluation-value memory 123, in the peak detector 124 (step P7).

When the latest evaluation value A is larger than the last evaluation value B (YES in step P7), the AF control unit 12 determines that the AF evaluation value has not reached the peak value yet, and subsequently, determines whether or not the shutter key is fully pressed by a user (step 28). Concretely, it is determined whether or not the full-press detection signal is supplied from the full-pressing detector 6-2.

As a result, when it is determined that the shutter key is not fully pressed (NO in step PB), it is determined whether or not the half-press detection signal from the half-press detector 6-1 is remained in the ON state, that is, it is determined (step P9) whether or not the shutter key is kept in the half pressed state.

When the shutter key is kept in the half pressed state (YES in step P9), the AF control unit 12 determines that the automatic-focusing processing is required to be continued, and supplies a pulse signal with a period of 2T from the focusing-motor controller 125 to the lens driving motor unit 11 for stepping drive of the lens driving motor unit 11. Thereby, the focus lens is moved from the side of near point to the side of infinite distance by a step distance a (step P10). Thereafter, processing in the AF control unit 12 returns to that of step P4.

On the other hand, when the shutter key is not half pressed (NO in step P9), the AF control unit 12 determines that the automatic-focusing processing is required to be completed, and the processing returns to the processing in step P1, in which the unit 12 waits until the shutter key is half pressed again.

Moreover, when it is determined that the shutter key is fully pressed in the processing in step P8 (YES in step P8), the AF control unit 12 assumes that a user gives an instruction for capturing, and supplies a pulse signal with a period shorter than that of the case in which the shutter key is in the half-press state from the focusing-motor controller 125 to the lens driving motor unit 11. Thereby, the lens driving motor unit 11 performs stepping drive at a higher speed than that of the case in which the shutter key is in the half-press state, and the focus lens is moved from the side of near point to the side of infinite distance by distance 2a (step P11). Thereafter, processing in the AF control unit 12 returns to that of step P4.

When the latest evaluation value A reaches equal to or smaller than the last evaluation value B (NO in step P7) after processing in steps P4 through P11 is repeated, the AF control unit 12 controls the lens driving motor unit 11 in the focusing-motor controller 125 for rotational driving in the opposite direction to that of the case in which the shutter key is fully pressed, or is half pressed, and the focus lens is returned to the last position. Thus, the focus lens is set at the focused position. At this time, the AF termination signal is supplied from the AF control unit 12 to the control unit 10.

Then, when the AF termination signal is supplied from the AF control unit 12, it is determined in the control unit 10 (step P12) whether or not the shutter key has been fully pressed by a user. When the shutter key has been fully pressed (YES in step P12), capturing processing (step P13), and storage processing (step P14) are sequentially executed. When the shutter key has not been in the full pressed state (NO in step P12), the control unit 10 waits under looping until the shutter key is fully pressed and YES is obtained in step P12.

Here, the capturing processing in step P13 and the storage processing in step P14 will be explained. The control unit 10 temporally interrupts a path from the DMA controller to the DRAM at the DMA transfer of the luminance signal Y and the color difference signals Cb and Cr for one frame from the DMA controller to the DRAM. Subsequently, the control unit 10 generates image data in a predetermined format to store the generated data into a SD memory card one by one after the luminance signal Y, the color difference signals Cb and Cr for one frame are read out from the DRAM every predetermined unit of signals and are compressed. Then, the control unit 10 reconnects the interrupted path when the storage of the image data for one frame is completed. Thus, the capturing and storage of images are executed in the digital camera 1.

The above-described description has been made for concrete operations executed in the digital camera 1.

Figure 4:
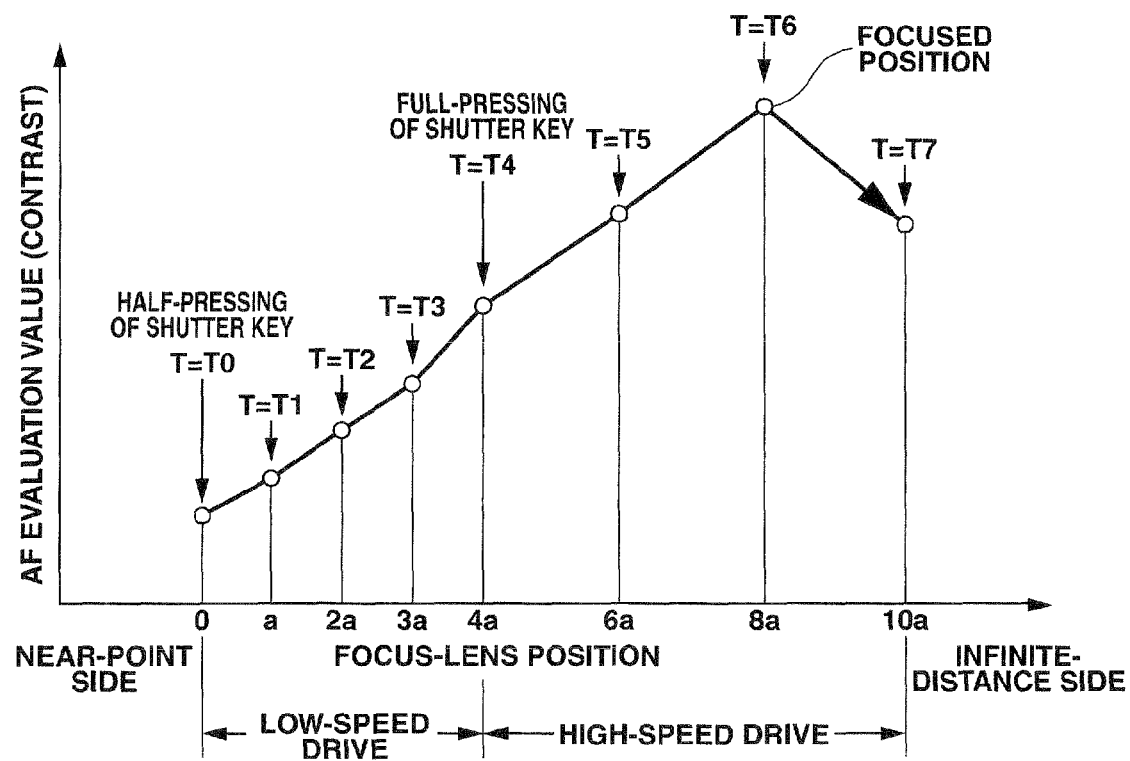
FIG. 4 is a graph showing a relation between positions of a focus lens and AF evaluation values.

Next, automatic-focusing processing in steps P3 through P11 will be more specifically explained, assuming as one example that the shutter key is fully pressed before a focused state is obtained. FIG. 4 is a graph showing a relation between the positions of the focus lens and the AF evaluation values.

As shown in FIG. 4, when the shutter key is half pressed by a user at T=T0 (YES in step P3), the AF control unit 12 moves the focus lens to the initial position (step P4). Subsequently, the focus lens is driven from the side of near point to the side of infinite distance in the low speed at a speed of a per unit time (step P10).

Thereafter, the processing in step P10 is executed till T=T4 during which the shutter key is fully pressed, during which the focus lens advances to a point of 4a (search point). Then, when the shutter key is fully pressed by a user at T=T4 (YES in step P8), the AF evaluation value has not reached the peak at this point yet (YES in step P7). Accordingly, the AF control unit 12 accelerates the driving speed of the focus lens to a speed of 2a per unit time for starting of high-speed driving (step P11).

Thereafter, processing in steps P4 through P11 is repeated till T=T7, during which the focus lens advances to a point of 10a (search point). Then, when it is determined at T=T7 (NO in step P7) that the AF evaluation value is lowered, the AF control unit 12 determined that the AF evaluation value has reached the peak at T=T6, and the focus lens is returned to a point of 8a a at a speed of 2a per unit time. Thereby, the focus lens is set at the focused position.

As explained above, the digital camera 1 according to the first embodiment has a configuration in which the focus lens is moved at a higher speed than that of the case in which the shutter key is half pressed and the focused position is detected when the shutter key is fully pressed by a user before the focus lens reaches the focused position. Thereby, the digital camera 1 can achieve focusing with less delay in capturing even when the shutter key is fully pressed by a user before the focus lens reaches the focused position.

The first embodiment has a configuration in which AF processing in low-speed mode and AF processing in high-speed mode are prepared in the AF method of a contrast detection type, the AF processing in low-speed mode and the AF processing in high-speed mode are switched according to timing of half pressing and that of full-pressing of the shutter key as shown in the flowchart of FIG. 3, a moving amount of the focus lens for one frame (step interval) is decreased during the AF processing in low-speed mode, and a moving amount of the focus lens for one frame (step interval) is increased during the AF processing in high-speed mode. However, a method for shortening focusing time during the AF processing in high-speed mode and the AF processing in low-speed mode is not limited to this embodiment, and there is a method for shortening focusing time as described in, for example, the after-described six modified examples.

The above-described embodiment has a configuration in which the focus lens is stopped at search (capturing) points (boundary points between steps), and the moving speed of the focus lens during the AF processing in low speed mode is the same as that of the AF processing in high speed mode. However, when the focus lens is not stopped at the search points, a similar AF evaluation value to that of the above embodiment can be acquired at the same search points as those of the embodiments by a configuration in which the moving speed of the focus lens is reduced during AF processing in low-speed mode, and the moving speed of the focus lens is made higher than that of the AF processing in low-speed mode.

FIG. 5 is a flowchart showing the outline of the AF operations by which the AF processing in low-speed mode and the AF processing in high-speed mode are switched according to timing of half pressing and that of full-pressing of the shutter key, and shows basic points common to the first embodiment and the modified examples 1 to 6 (will be described later).

In FIG. 5, when the power supply of the digital camera 1 is turned into the ON state, the control unit 10 executes necessary initial setting such as resetting of the RAM, the DRAM, and the VRAM, and setting for on-board registers (step Q0).

Subsequently, automatic exposure (AE) processing for the through-image is executed by using a focal length corresponding to a zoom value at the time, and the through-image is displayed on the display device 8 (step Q1).

The control unit 10 determines whether or not the shutter key is half pressed, that is, whether or not the half-press detection signal is supplied from the half-press detector 6-1. When the shutter key is half pressed, the processing proceeds to step Q3; and when not half pressed, the control unit 10 waits until the shutter key is half pressed (step Q2).

When the shutter key is half pressed, the control unit 10 further determines whether or not the shutter key is fully pressed, that is, whether or not the full-press detection signal is supplied from the full-pressing detector 6-2 (step Q3). When fully pressed, the processing proceeds to step Q5, and, when not fully pressed (that is, in a case in which the shutter key is remained in the half pressing state), the processing proceeds to step Q4.

When the shutter key is not fully pressed, the AF processing in low-speed mode (refer to explanations of the first embodiment (steps P3 through P7, and P10 in FIG. 3), and the modified examples 1 to 6) is executed, and thereafter, the AF processing in low-speed mode is continued (step Q4) until it is detected in step Q3 that the shutter key is fully pressed. When the AF processing in low-speed mode is completed before it is detected that the shutter key is fully pressed, no processing is performed in step Q4, and the control unit 10 waits in step Q3 until the shutter key is fully pressed.

When it is detected in step Q3 that the shutter key is fully pressed, the control unit 10 determines whether or not the AF processing (that is, the AF processing in low-speed mode in step Q4, or the AF processing in high-speed mode in step Q6) is completed, that is, whether or not the AF termination signal is supplied from the AF control unit 12 (step Q5). When the AF processing is completed, the processing proceeds to step Q7, and when not completed, the processing proceeds to step Q6. Even when the AF processing in low-speed mode at step Q4 is not completely ended and when processing in which the AF search processing in low-speed mode is completed and the focus lens is under moving to a focused position, it is determined in step Q5, that the AF processing is completed, and the processing proceeds not to AF processing in high-speed mode in step Q6, but to capturing processing and the record processing in step Q7 after moving of the focus lens to the focused position is completed.

When it is determined that the AF processing is not completed in step Q5, the AF processing in high-speed mode (refer to explanations of the first embodiment (steps P3 through P7, and P11 in FIG. 3), and the modified examples 1 to 6) is executed. Thereafter, the AF processing in high-speed mode is continued until it is detected in step Q5 that the AF processing is completed. Moreover, when the AF processing in low-speed mode is not completed at a point when the shutter key is fully pressed, the processing is switched from the AF processing in low-speed mode in step Q4 to the AF processing in high-speed mode, and the focused position is configured to be detected through the AF processing in low-speed mode and the AF processing in high-speed mode (step Q6).

Immediately after it is determined that the AF processing is completed in step Q5, the processing is switched to a CCD drive method for the image capturing to execute image compression processing of the captured image data, and compressed image data (image file) is recorded to complete capturing of images for one frame (step Q7).

Furthermore, the AF processing in low-speed mode in step Q4 and the AF processing in high-speed mode in step Q6 will be explained in the after-described modified examples 1 to 6 according to the first embodiment. Moreover, when AF processing is executed in such a way that the moving amount (step interval) of the focus lens for one frame is decreased in step Q4, and the moving amount (step interval) of the focus lens for one frame is increased in step Q6 by controlling the lens driving motor unit 11 through the AF control unit 12, the AF operations are similar to those for the first embodiment.

Moreover, the flowchart shown in FIG. 5 can be applied to a case in which full-pressing (AF operation in high-speed mode) can be started without half pressing (AF processing in low-speed mode) of the shutter key. For example, there may be adopted a configuration in which, when the shutter key is pressed at one stroke in steps Q2 and Q3 in FIG. 5, half-press operation is not started unless the shutter key is kept half pressed for equal to, or longer than a predetermined time as will be described in an example shown in FIG. 19 later. When the above configuration is adopted, it is determined that the shutter key is pressed at one stroke if the shutter is fully pressed within the predetermined time after the shutter key is half pressed, and the AF processing in high-speed mode in step Q6 is executed without executing AF processing in low-speed mode in step Q4.

Moreover, as a method for determining that the shutter key is pressed at one stroke, another method may be adopted. In the method, by installing a shutter key by which the half-press operation can not be electrically detected (recognized) unless the half-press operation is kept for a predetermined time, it is repeatedly determined whether the shutter key is fully pressed or the shutter key is half pressed. Then, the AF processing in high-speed mode in step Q6 is executed without executing AF processing in low-speed mode in step Q4, based on determination that the shutter key is pressed at one stroke, when it is determined without determination in which the shutter key is half pressed that the shutter key is fully pressed.

First Modified Example

There may be adopted a configuration as follows in which, based on switching the AF processing in low-speed mode and the AF processing in high-speed mode according to timing of half pressing and that of full-pressing of the shutter key, a moving speed of the focus lens during the AF processing in high-speed mode is increased more than that during the AF processing in low-speed mode. AF processing time can be shortened by an amount by which the moving speed of the focus lens increased.

Concretely, step Q4 in the flowchart shown in FIG. 5 may have a configuration in which "the control unit 10 controls the AF control unit 12 to start the AF processing of the contrast detection type including processing by which the focus lens is moved at a predetermined moving speed V1". In addition, step Q6 in the flowchart shown in FIG. 5 may have a configuration in which "the control unit 10 controls the AF control unit 12 to start the AF processing of the contrast detection type including processing by which the focus lens is moved at a moving speed V2 higher than the speed V1".

According to the first modified example, the interval between search points at the AF processing in high-speed mode is longer than the interval between search points at the AF processing in low-speed mode in the same manner as that of the first embodiment, for example, when the frame rate of the CCD at AF processing in low-speed mode, and that at AF processing in high-speed mode are the same with each other. Moreover, the interval between search points at the AF processing in high-speed mode and that at the AF processing in low-speed mode can be configured to be the same by a configuration in which the frame rate of the CCD at AF processing in low-speed mode is faster than that at AF processing in high-speed like the after-described second modified example.

Here, the first modified example is effective for either a case in which the focus lens is temporarily stopped at search points, or a case in which the focus lens is not stopped at search points.

Second Modified Example

There may be adopted a configuration as follows in which, based on switching the AF processing in low-speed mode and the AF processing in high-speed mode according to timing of half pressing and that of full-pressing of the shutter key, a user can easily follow a moving subject by displaying a through-image even at AF processing in low-speed mode, and AF processing is executed at a higher frame rate by interrupting display of a through-image at AF processing. For example, during AF processing in high-speed mode, the frame rate can be increased by extracting a part of a CCD (image capture element 3) for driving, or by reading out combined pixels for driving. Even in a state in which the frame rate is increased and the moving speed of the focus lens is more increased by an amount corresponding to the increased amount of the frame rate, the accuracy of AF processing can be maintained because a number of search points are not required to be decreased. The focusing time can be shortened because, based on a configuration in which only one third of pixels among all pixels in the CCD are read out, the frame rate is increased by an amount (three times in this example) corresponding to the decreased amount of the pixels, and the moving speed of the focus lens can be increased.

Concretely, step Q4 in the flowchart shown in FIG. 5 may have a configuration in which "the control unit 10 controls the AF control unit 12 to start the AF processing of the contrast detection type including processing by which the focus lens is moved at a first moving speed, and, at the same time, to display a through-image on the display device 8 during the above processing until the shutter key is fully pressed". In addition, step Q6 in the flowchart shown in FIG. 5 may have a configuration in which "the control unit 10 interrupts display of a through-image, and reads out a part of the CCD for driving to increase a frame rate to a value higher than that of AF processing in low-speed mode, and, at the same time, the control unit 10 controls the AF control unit 12 to start the AF processing of the contrast detection type including processing by which the focus lens is moved at a second moving speed higher than the first speed". Here, this modified example 2 is effective for either a case in which the focus lens is temporarily stopped at search points, or a case in which the focus lens is not stopped at search points.

Third Modified Example

Figure 8A:
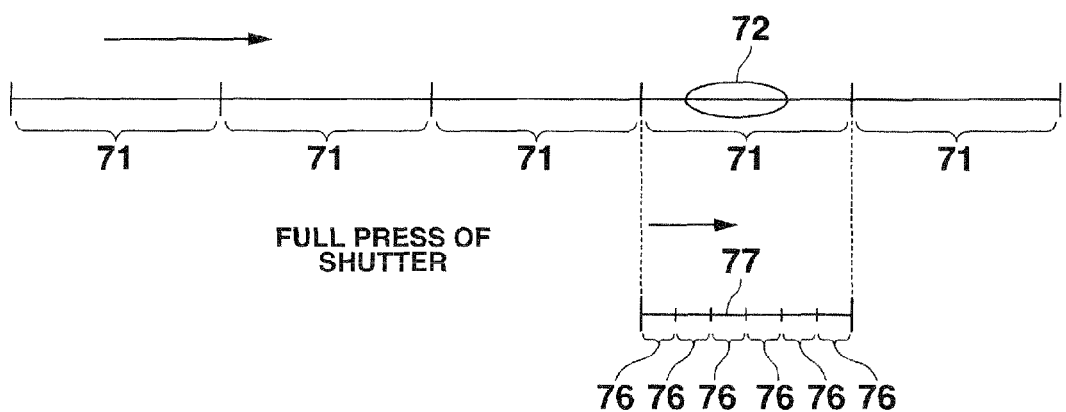
FIGS. 8A and 8B are views each explaining a method for searching a focus point according to the third modified example of the first embodiment.

Moreover, there may be adopted a configuration as follows. Based on switching the AF processing in low-speed mode and the AF processing in high-speed mode according to timing of half pressing and that of full-pressing of the shutter key, an approximate focus position (focused position) 72 is detected by rough AF search processing with a large moving amount 71 of the focus lens for one frame (=long step interval (interval between lens positions)) during the AF processing in low-speed mode as shown in FIG. 8A. Subsequently, an exact focus position 77 is detected by detailed AF search processing with a small moving amount 76 of the focus lens (=short step interval) in the vicinity of the detected focus position at AF processing in low-speed mode. During the AF processing in high-speed mode, only rough AF search processing with a large moving amount 71 of the focus lens for one frame is performed, that is, AF search processing with a small moving amount 76 of the focus lens is omitted during AF processing in high-speed mode.

For example, when the shutter key is fully pressed during AF processing in low-speed mode, and rough AF search processing is underway at the full-press time, the focus position is obtained only by the rough AF search processing without the detailed AF search processing after completing the rough AF search processing.

Figure 8B:
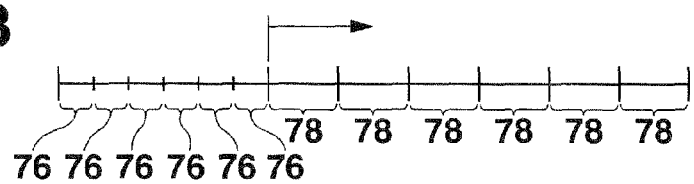

Moreover, there may be adopted a configuration in which, when AF processing in low-speed mode is switched to AF processing in high-speed mode, and detailed AF search processing is underway at the switching, switching to intermediate rough search processing is performed under a moving amount (=within a step interval) 78 of the focus lens for one frame as shown in FIG. 8B. Further, when the shutter key is fully pressed during the AF processing in low-speed mode, and the detailed AF search processing is underway at the full-press time, the detailed AF search processing may be continued.

The approximate focus position is obtained by rough AF search processing at first. Then, the exact focus position is obtained with a narrow search interval including the approximate focus position according to two-step AF processing during the AF processing in low-speed mode. A focus position is obtained only by rough AF search processing during the AF processing in high-speed mode as described above. Consequently, necessary time can be shortened by an amount by which detailed AF search processing is not performed, and finally, focusing time can be reduced by an amount by which the moving speed of the focus lens increased.

Figure 9:
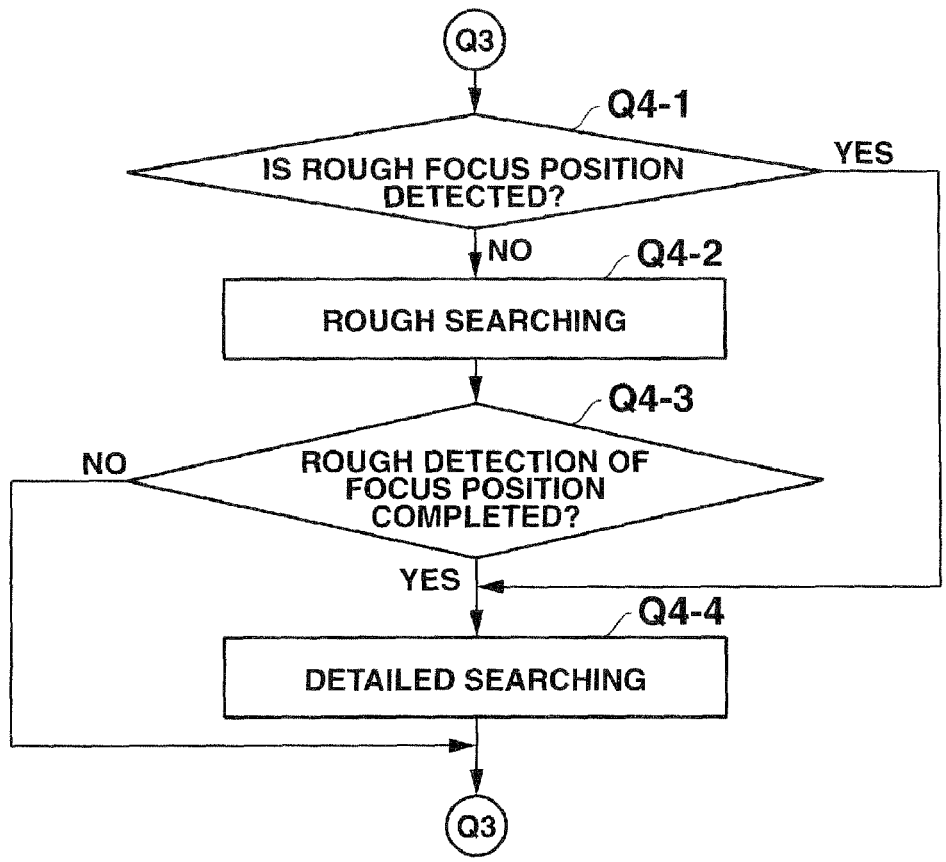
FIG. 9 is a flowchart showing an outline of AF operations of AF processing in low-speed mode according to the third modified example of the first embodiment.

Concretely, as shown in the flowchart of FIG. 9, step Q4 in the flowchart shown in FIG. 5 may have a configuration in which, "when the shutter key is not fully pressed, the control unit 10 determines whether or not an approximate focused position 72 has been detected, and the processing proceeds to step Q4-4 when the approximate focused position 72 has been detected, or the processing proceeds to step Q4-2 when is not detected (step Q4-1)".

In addition, the above step Q4 may have a configuration in which "the control unit 10 first instructs the AF control unit 12 to drive the lens driving motor unit 11 for AF search processing with a rough search interval 71 as shown in FIG. 8A under a large moving amount of the focus lens for one frame, when an approximate focused position 72 has not been detected (step Q4-2); and, when a focus evaluation value for the current lens position is determined and an approximate focused position 72 is detected, the processing proceeds to step Q4-4, and, when not detected, the processing returns to step Q3 (step Q4-3)".

Moreover, the above step Q4 may have a configuration in which "the control unit 10 instructs the AF control unit 12 to drive the lens driving motor unit 11 for AF search processing with a detailed search interval 76 when the approximate focused position is detected in step Q4-3 (step Q4-4)".

Furthermore, no processing is not performed in step Q4-4 after the focus evaluation value of the current lens position is determined in step Q4-4 to detect the focused position 77, and the focus lens is moved to the focused position 77.

Thereby, the approximate focus position (focused position) 72 can be detected by rough AF search processing with a large moving amount of the focus lens for one frame, and, subsequently, the exact focus position 77 can be detected by detailed AF search processing with a small moving amount of the focus lens in the vicinity of the detected focus position.

Figure 10:
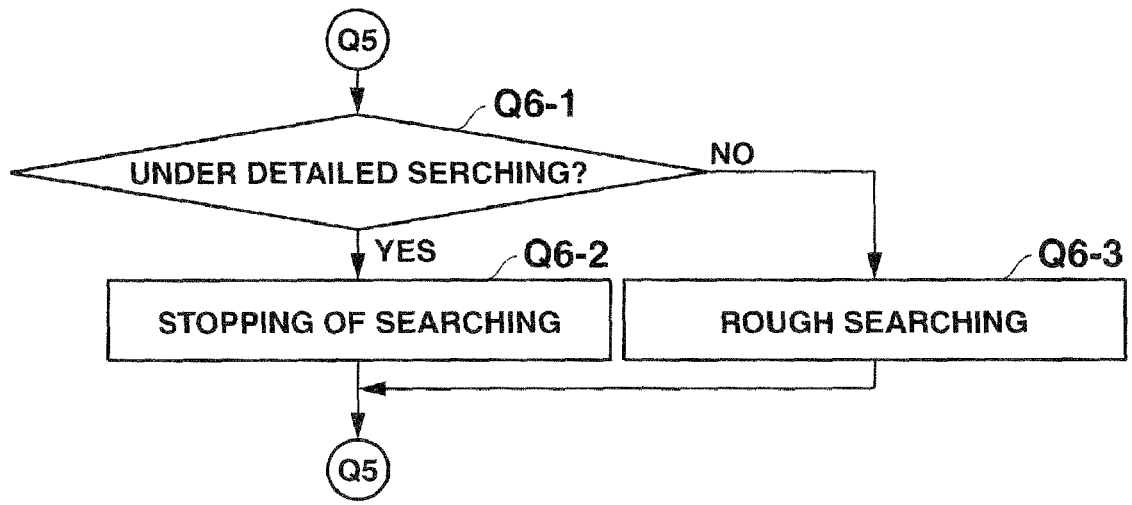
FIG. 10 is a flowchart showing an outline of AF operations in high-speed mode according to the third modified example of the first embodiment.

Moreover, as shown in the flowchart of FIG. 10, step Q6 in the flowchart shown in FIG. 5 may have a configuration in which "when AF processing in low-speed mode has not been completed, the control unit 10 determines whether or not the detailed AF search processing in step Q4-4 in FIG. 9 is underway (step Q6-1), and the processing proceeds to step Q6-2 when the detailed AF search processing is underway, or the processing proceeds to step Q6-3 when the rough AF search processing is underway"; "when detailed AF search processing is underway, the control unit 10 immediately stops detailed AF search processing, that is, AF processing, and the processing proceeds to step Q5 after the focus lens position at the stopping time is set as the focused lens position (step Q6-2)"; and "when the rough AF search processing is underway, the control unit 10 continuously instructs the AF control unit 12 to drive the lens driving motor unit 11 for AF search processing under a large moving amount of the focus lens for one frame as shown in FIG. 8A, and the processing returns to step Q5 (step Q6-3)".

Thereby, when AF processing in low-speed mode is switched to AF processing in high-speed mode, and detailed AF search processing is underway at the switching, the detailed AF search processing is stopped. When rough AF search processing is underway at the switching of the AF processing, the rough AF search processing is continuously performed.

Fourth Modified Example

Moreover, there may be adopted a configuration in which, based on switching the AF processing in low-speed mode and the AF processing in high-speed mode according to timing of half pressing and that of full-pressing of the shutter key, exposure time for one frame is increased at AF processing in low-speed mode, and, at AF processing in high-speed mode, exposure time for one frame is shorter than the exposure time at the AF processing in low-speed mode. Thereby, in the case in which the focus lens is stopped at AF search points, AF processing time can be shortened by an amount by which stopping time is made shorter by the shorter exposure time, and even in the case in which the focus lens is not stopped at AF search points, the AF processing time can be reduced by an amount by which a frame rate is made higher by the shorter exposure time.

Concretely, step Q4 in the flowchart shown in FIG. 5 may have a configuration in which, "the control unit 10 controls the AF control unit 12 to start the AF processing of the contrast detection type by making the exposure time for one frame longer. In addition, step Q6 in the flowchart shown in FIG. 5 may have a configuration in which, "the control unit 10 controls the AF control unit 12 to start the AF processing of the contrast detection type by making the exposure time for one frame shorter than the exposure time at AF processing in low-speed mode."

Fifth Modified Example

Figure 11:
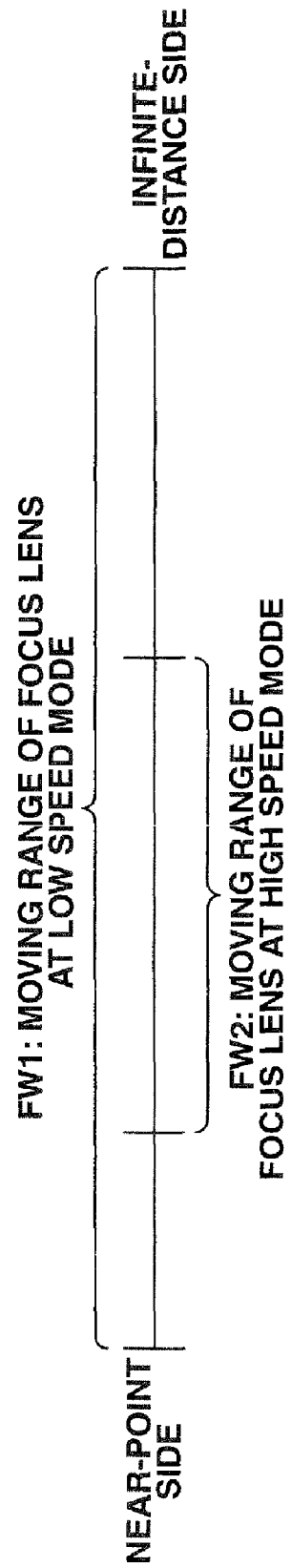
FIG. 11 is a view explaining a focus-lens moving range according to the fifth modified example of the first embodiment.

Moreover, there may be adopted a configuration in which, based on switching the AF processing in low-speed mode and the AF processing in high-speed mode according to timing of half pressing and that of full-pressing of the shutter key, a moving range (AF search range) FW1 of the focus lens is made wider at AF processing in low-speed mode, and a moving range FW2 of the focus lens is made narrower at AF processing in high-speed mode, as shown in FIG. 11. Here, when, assuming that the moving range FW2 is completely included within the moving range FW1 as shown in FIG. 11, switching is made to AF processing in high-speed mode during AF processing in low-speed mode, and AF search processing with a narrow moving range FW2 has already been completed at the switching, AF search processing (AF processing) is required to immediately be completed. Moreover, under a state in which switching is made to AF processing in high-speed mode during AF processing in low-speed mode, and AF search processing with a narrow moving range FW2 has not been completed at the switching, AF search processing is continued till the AF search processing with a narrow moving range FW2 is completed when the AF search processing with a narrow moving range FW2 is underway. When the AF search processing with a narrow moving range FW2 is not underway, AF search processing with a narrow moving range FW2 is performed after the focus lens is moved to the end of the narrow moving range FW2 without AF search processing.

Thereby, focusing time is shortened because the number of times the focus lens is stopped (driving time of the focus lens), that of times contrast data is acquired, that of times the contrast data is compared, and the like are small under a state in which the moving range of the focus lens at AF processing in high-speed mode is narrower in comparison of the range between AF processing in low-speed mode. Furthermore, focusing time is shortened as a whole by combination of AF processing in low-speed mode and AF processing in high-speed mode even when the shutter key is fully pressed during AF processing in low-speed mode.

Concretely, step Q4 in the flowchart shown in FIG. 5 may have a configuration in which, "the control unit 10 controls the AF control unit 12 to perform the AF processing of the contrast detection type by AF search processing with a wide moving range FW1." In addition, step Q6 in the flowchart shown in FIG. 5 may have a configuration in which, "the control unit 10 controls the AF control unit 12 to perform the AF processing of the contrast detection type by AF search processing with a narrow moving range W2."

Sixth Modified Example

Moreover, the above described first embodiment and the first to fifth modified examples, which have been described above, may be combined for this invention. FIG. 6 is a table summarizing operations of AF processing in low-speed mode and AF processing in high-speed mode according to the first embodiment and the first to fifth modified examples. FIG. 7 is a view showing combination examples of AF processing based on AF processing in low-speed mode and AF processing in high-speed mode, and shows combinations by which AF processing can be realized by selecting two of combinations of the first embodiment and the first to fifth modified examples, depending on AF processing in low-speed mode and AF processing in high-speed mode. In the combination fields in FIG. 7, a symbol "Z" denotes the first embodiment, and symbols "H1" to "H5" denote the first to fifth modified examples, respectively.

For example, in, FIG. 7, a combination of "H5, Z" which is one of examples combining two of the first embodiment and the first to fifth modified examples means, as described in FIG. 6, that, during AF processing in low-speed mode, the focus lens is moved within a wide moving range of the focus lens (fifth modified example) under a small moving amount (step interval) of the focus lens for one frame (first embodiment); and, during AF processing in high-speed mode, the focus lens is moved within a narrow moving range of the focus lens (fifth modified example) under a large moving amount (step interval) of the focus lens for one frame (first embodiment).

Furthermore, a combination of "H2, H1" means that, during AF processing in low-speed mode, the focus lens is moved with a small moving amount of the focus lens for one frame (first modified example) in order to display a through-image (second modified example); and, during AF processing in high-speed mode, the focus lens is moved with a large moving amount of the focus lens for one frame under a state in which display of a through-image is stopped.

Moreover, the examples in FIG. 7 have shown the examples combining two of the first embodiment and the first to fifth modified examples, but examples combining 3 to 5 of the first embodiment and the first to fifth modified examples may be applied to this invention. For example, a combination of "H4, H5, H3" means that, during AF processing in low-speed mode, AF exposure time for one frame is increased (fourth modified example); AF search processing is roughly performed within a wide range of the focus lens (fifth modified example) under a large moving amount of the focus lens for one frame to detect an approximate focus position; and, thereafter, detailed AF search processing is performed with a small moving amount of the focus lens in the vicinity of the detected focus position to detect an accurate focus position (third modified example); during AF processing in high-speed mode, AF exposure time for one frame is shortened (fourth modified example), and AF search processing is roughly performed (third modified example) within a narrow range of the focus lens (fifth modified example) under a large moving amount of the focus lens for one frame.

Other embodiments of the present invention according to the present invention will be described. The same portions as those of the first embodiment will be indicated in the same reference numerals and their detailed description will be omitted.

Second Embodiment

The first embodiment has a configuration in which AF processing in low-speed mode and AF processing in high-speed mode are provided in an AF method of a contrast detection type; the AF processing in low-speed mode is executed from a point at which a shutter key is half pressed to a point at which the shutter key is fully pressed; and the AF processing in low-speed mode is switched to the AF processing in high-speed mode when the shutter key is fully pressed. However, there may be applied a configuration in which AF necessary time is predicted at a point at which the shutter key is fully pressed for a case in which AF processing in low-speed mode is continuously executed, and for a case in which AF processing in high-speed mode is executed from the beginning, and AF processing is executed according to mode in which the predicted necessary-time is shorter.

Figure 13A:
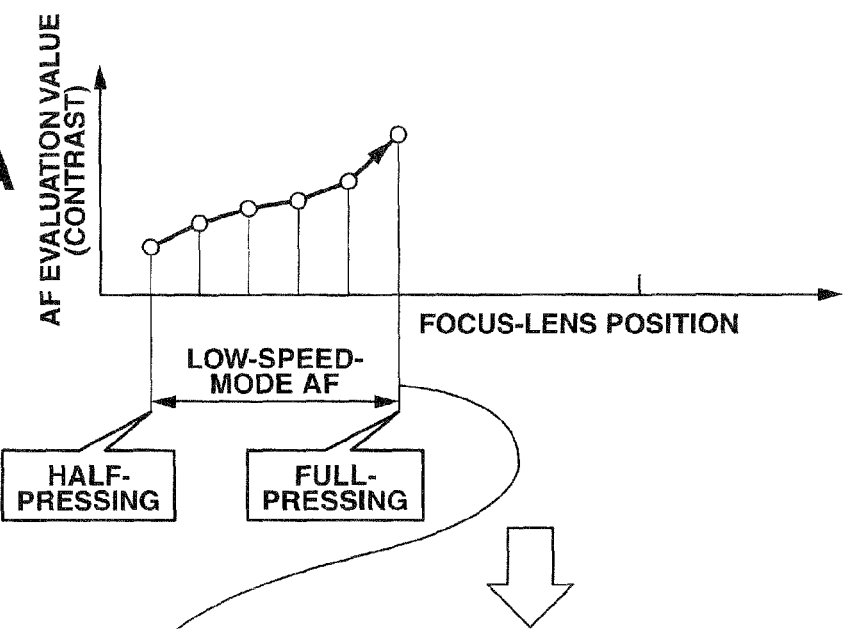
FIGS. 13A and 13B are views each showing a relation between the positions of the focus lens and the AF evaluation values in a case in which AF processing is switched to AF processing in high-speed mode during AF processing in low-speed according to the second embodiment.
Figure 13B:
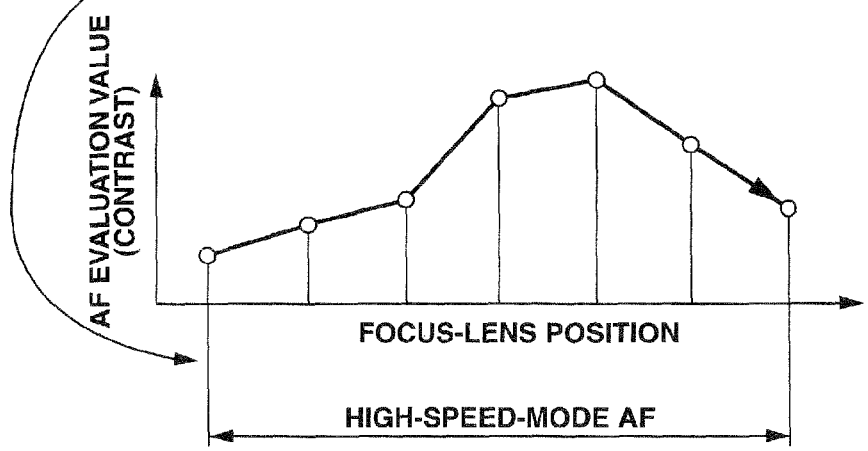

FIG. 12 is a flowchart showing the content for concrete operations of a digital camera according to the second embodiment. FIGS. 13A and 13B are views each showing a relation between the positions and AF evaluation values when switching is made to AF processing in high-speed mode during AF processing in low-speed mode.

In FIG. 12, when the power supply of a digital camera 1 is turned into the ON state, the control unit 10 executes necessary initial setting such as resetting of the RAM, DRAM, and VRAM, and setting for on-board registers at first (step R0).

Subsequently, AE processing for a through-image is executed, using a focal length corresponding to a zoom value at the time, and the through-image is displayed on the display device 8 (step R1).

The control unit 10 determines whether or not the shutter key is half pressed, that is, whether or not a half-press detection signal is supplied from the half-press detector 6-1. When the shutter key is half pressed, the processing proceeds to step R3, and when not half pressed, the control unit 10 waits until the shutter key is half pressed (step R2).

When the shutter key is half pressed, the control unit 10 further determines whether or not the shutter key is fully pressed, that is, whether or not a full-press detection signal is supplied from the full-pressing detector 6-2. When fully pressed, the processing proceeds to step R5, and when not fully pressed (that is, in a case in which the shutter key is remained in the half pressing state), the processing proceeds to step R4 (step R3).

When the shutter key is not fully pressed, the processing returns to step R3 after AF processing in low-speed mode (first embodiment (refer to the explanation for FIG. 3)) is executed for one frame (step R4).

When the shutter key is fully pressed, the control unit 10 determines whether or not the AF processing (that is, the AF processing in low-speed mode in step R4) is completed, that is, whether or not the AF termination signal is supplied from the AF control unit 12. When the AF processing is completed, the processing proceeds to step R13, and, when not completed, the processing proceeds to step R6 (step R5).

When AF processing (AF processing in low-speed mode in step R4) is not completed at full-pressing of the shutter key (for example, a case shown in FIG. 13A), the control unit 10 calculates necessary time A for focusing from the current time under a state in which AF processing in low-speed mode is continuously executed, and necessary time B for focusing from the current time under a state in which AF processing in high-speed mode is executed from the beginning (step R6). Furthermore, when the necessary time A for focusing and the necessary time B for focusing are compared, the processing proceeds to step R8 in the case of A>B, and the processing proceeds to step R11 in the case in which A is not larger than B (step R7).

When the necessary time A for focusing is longer than the necessary time B for focusing, the control unit 10 resets the position of the focus lens (step R8), and AF processing in high-speed mode (first embodiment (refer to the explanation for FIG. 3)) is executed for one frame (step R9) in order to execute AF processing in high-speed mode from the beginning as shown in FIG. 13B. Furthermore, it is determined (step R10) whether or not AF processing (that is, AF processing in high-speed mode in step R9) is completed, that is, whether or not the AF termination signal is supplied from the AF control unit 12. The processing proceeds to step R13 when the AF processing is completed, and the processing returns to step R9 when not completed.

When the necessary time A for focusing is equal to or shorter than the necessary time B for focusing, the control unit 10 continuously executes AF processing in low-speed mode (first embodiment (refer to the explanation for FIG. 3)) for one frame from the position of the focus lens at full-press of the shutter key of step R3 (step R11). Furthermore, it is determined whether or not AF processing (that is, AF processing in low-speed mode) is completed, that is, whether or not the AF termination signal is supplied from the AF control unit 12. The processing proceeds to step R13 when the AF processing is completed, and the processing returns to step R11 when not completed (step R12).

When the AF processing is completed in step R10 or R12, the processing is switched to a CCD drive method for the image capturing to execute image compression processing of the captured image data, and compressed image data (image file) is recorded to complete capturing of images for one frame (step R13).

According to operations in the flowchart shown in FIG. 12, AF operation after full-pressing of the shutter key depends on AF processing with shorter necessary time for focusing, either of AF processing in low-speed mode or AF processing in high-speed mode according to timing of full-pressing of the shutter key. Therefore, the digital camera 1 can achieve focusing with less delay in capturing even when the shutter key is fully pressed by a user before the focus lens reaches the focused position.

There may be applied a configuration in which, when, in the flowchart of FIG. 12, steps R6, R7, R11, and R12 are omitted, and it is determined in step R5 that AF processing in low-speed mode is not completed, the processing proceeds to step R8, and AF processing in high-speed mode is executed from the beginning.

Configurations of the AF control unit 12 according to the first embodiment, the first to sixth modified examples, and the second embodiment can be obviously realized with hardware, and, at the same time, and the above configurations may be realized by use of software processing in the control unit 10. In this case, there may be applied a configuration in which the control unit 10 functions as AF control unit 12, programs realizing the above-described various kinds of processing are stored in the digital camera 1 (for example, ROM), and the control unit 10 executes the above programs.

Then, the digital camera 1 in which the above programs have been installed beforehand can be obviously provided, and an existing digital camera to which the above programs are applied can also function as the digital camera 1 according to the embodiments.

Moreover, a method by which the programs in the first and second embodiments are provided is arbitrary. The programs can be provided, for example, a communication medium such as the Internet; and the programs may be distributed in a form that the programs are stored in recording medium such as a memory card.

Third Embodiment

Figure 14A:
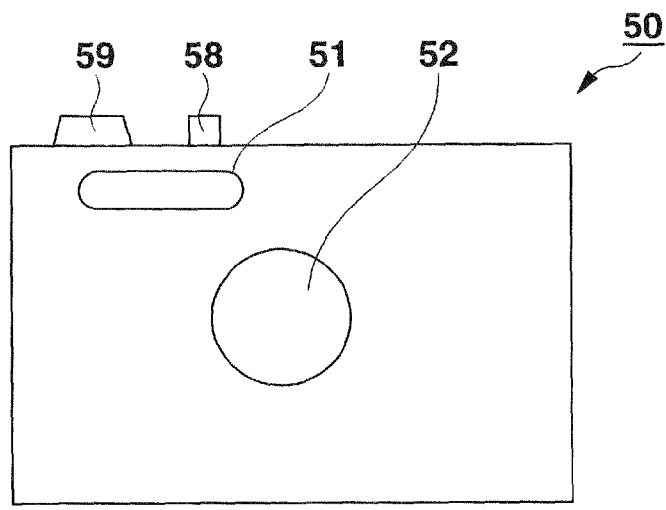
FIGS. 14A, 14B, and 14C are views each showing an appearance of one example of a digital camera according to third and fourth embodiments of the present invention.
Figure 14B:
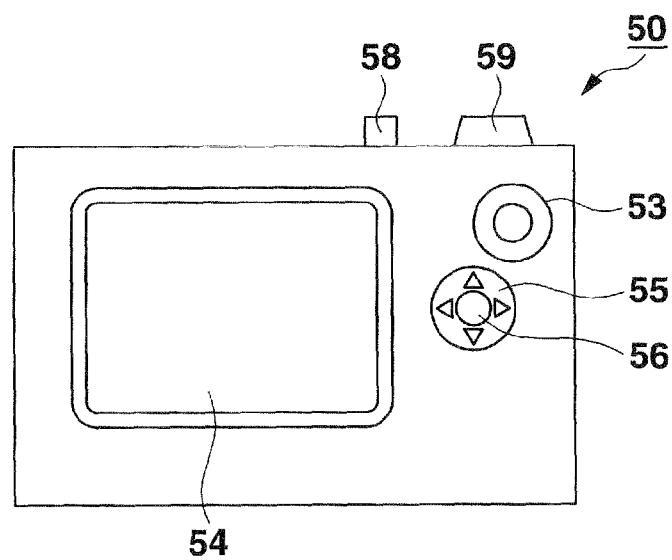
Figure 14C:
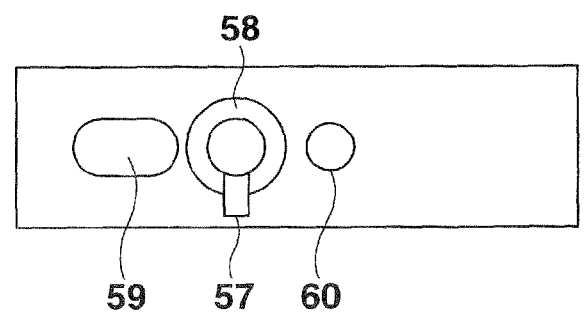

FIGS. 14A to 14C are views showing the appearance of a digital camera as one example of an image capture device according to third and fourth embodiments of this invention (hereinafter, called digital camera): FIG. 14A is a front view; FIG. 14B is a rear view; and FIG. 14C is a top view.

In FIGS. 14A to 14C, a digital camera 50 comprises an image capture lens 52 and with a stroboscopic light-emitting window 51 on the front as shown in FIG. 14A. Further, a mode dial 53, a liquid-crystal display screen 54, a cursor key 55, a set key 56, and the like are provided on the back of the digital camera 50 as shown in FIG. 14B. In addition, a zoom lever 57, a shutter key 58, a power supply button 59, a key for setting a stroboscopic light-emitting mode 60 are provided on the upper surface as shown in FIG. 14C. A universal serial bus (USB) terminal connection section used for a case in which external devices such as a personal computer (hereinafter, called a PC) and a modem are connected to a USB cable are provided on the side surface, though the USB terminal connection section is not shown in the drawing.

Figure 15:
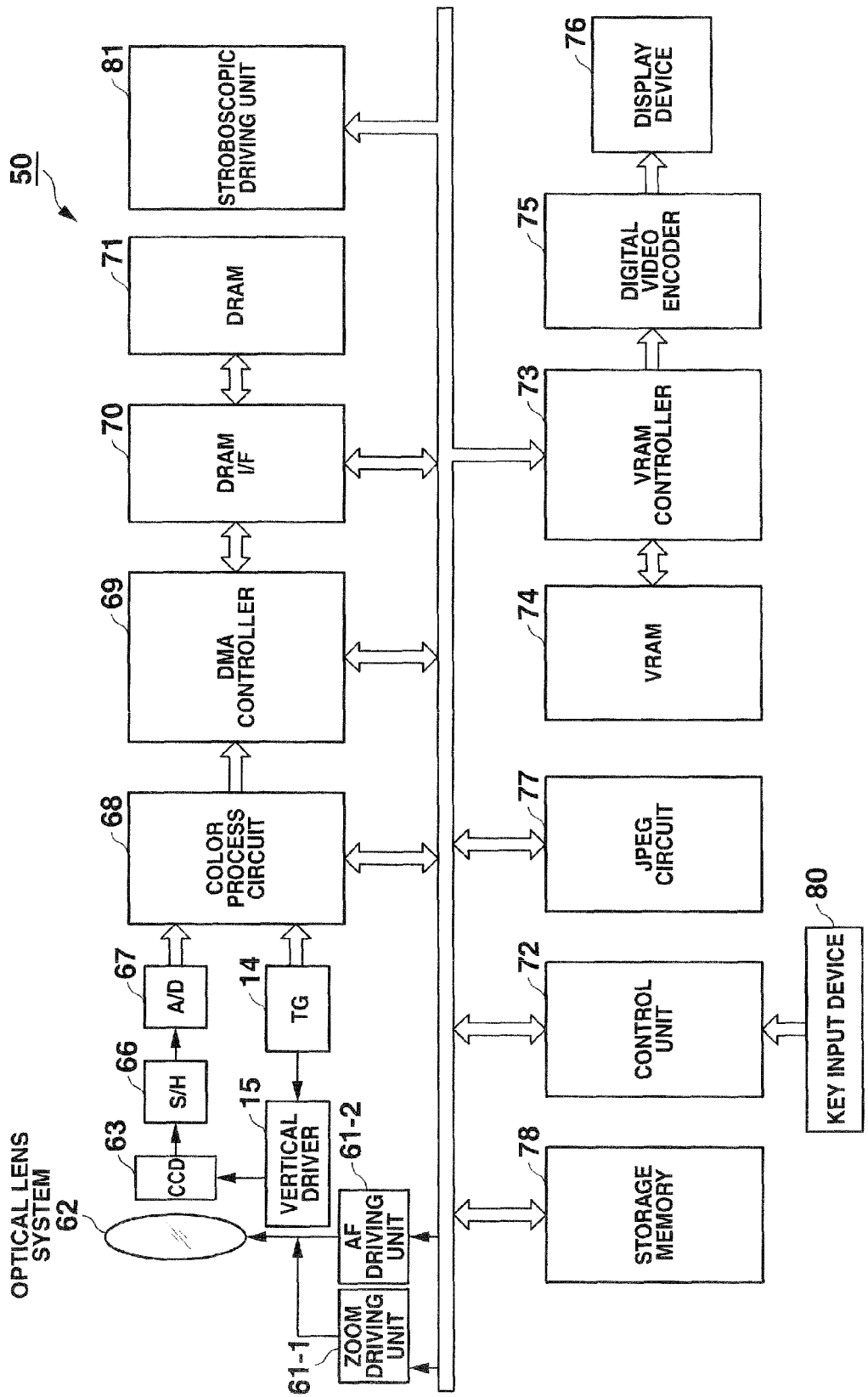
FIG. 15 is a view showing one example of an electric circuit configuration for the digital camera shown in FIGS. 14A to 14C.

FIG. 15 is a diagram showing one example of a configuration for the electronic circuit of the digital camera shown in FIGS. 14A to 14C. In FIG. 15, the digital camera 50 comprises a zoom driving unit 61-1 by which a zoom lens is moved for optical zooming operations in a capturing mode which is a basic mode; a AF driving unit 61-2 by which a focus position is moved by moving a focus lens; an optical lens system 62 forming the image capture lens 52 including the zoom lens and the focus lens; a CCD 63 which is an image capture element; a timing generator (TG) 64; a vertical driver 65; a sample-hold circuit (S/H) 66; an A/D converter 67; a color processing circuit 68; a direct memory access (DMA) controller 69; a DRAM interface (I/F) 70; a DRAM 71; a control unit 72; a VRAM controller 73; a VRAM 74; a digital video encoder 75; a display device 76; a joint photographic expert group (JPEG) circuit 77; a storage memory 78; a key input device 80 (including the keys 53 to 60 of FIGS. 14A to 14C); a flash driving unit 81, and the like. Here, the zoom driving unit 61-1 through the color processing circuit 68 are equivalent to an image pick-up portion in this invention. Moreover, the zoom driving unit 61-1 and the zoom lens are equivalent to optical zooming portion in this invention.

In the monitoring state under the capturing mode, the zoom driving unit 61-1 drives a zoom-lens driving motor unit (not shown) to move the zoom lens. The AF driving unit 61-2 drives a focus-lens driving motor unit (not shown) to move the focus lens to a focused point. Moreover, the CCD 63, which is arranged in a rearward position of a capturing optical axis of the optical lens system 62 forming the capturing lens 2 and is an image capture element, is driven for scanning by the timing generator (TG) 64 and the vertical driver 65. In a monitoring state during the capturing mode, photoelectric conversion output corresponding to an optical image focused with a constant period is output for one screen. This CCD 63 is a solid state imaging device which forms a two-dimensional image of a subject, and typically forms tens of frames of images of per second. Here, the image capture element is not limited to a CCD and may be a solid state imaging device such as a complementary metal oxide semiconductor (CMOS).

The photoelectric conversion output is adequately subjected to gain adjustment for each primary-color component of RGB in a state of signals of an analog value, is sampled and held in the sample-hold circuit (S/H) 66, is converted into digital data in the A/D converter 67, and is subjected to image-interpolation processing and correction processing in the color processing circuit 68 to generate a luminance signal Y, and color difference signals Cb and Cr with a digital value. Then, the luminance signal Y, and the color difference signals Cb and Cr are output to the DMA controller 69.

The DMA controller 69 performs DMA transfer of the luminance signal Y, and the color difference signal Cb, and Cr, which are output from the color processing circuit 68, by using a composite synchronous signal, a memory write enable signal, and a clock signal, which are similarly supplied from the color processing circuit 68, to a DRAM 71 used as a buffer memory through a DRAM interface (I/F) 70.

The control unit 72 has a function of control operation of the whole digital camera 50, and includes a CPU or a microprocessor unit (MPU) (hereinafter, called a CPU); a program storage memory such as a flash memory which fixedly stores programs (including an image-forming program) for operations, which include control of image-forming operation and are executed in the CPU as described later; a RAM used as a work memory; and the like. After DMA transfer of the luminance signal and the color difference signal to the DRAM 71 is completed, the control unit 72 reads out the luminance signal and the color difference signal from the DRAM 71 through the DRAM interface 70 for writing into the VRAM 74 through the VRAM controller 73.

According to a state signal from the key input device 80, the control unit 72 takes out an image-forming program and menu data corresponding to each mode, which are stored in the memory for storing programs, such as a flash memory, and executes control for executing of each function of the digital camera 50, and executes control for, for example, zooming operation, through display, flash driving control, automatic focusing, capturing, recording, reproduction and display of recorded images, display of a function selection menu when a function is selected, and display of a set screen, other than control for capturing operations when the shutter key is pressed at one stroke.

The digital video encoder 75 periodically reads out the luminance signal and the color difference signal from the VRAM 74 through the VRAM controller 73, and generates a video signal based on the above data, for output to the display device 76.

The display device 76 functions as a monitor display device (electronic viewfinder) at capturing mode as described above, and displays images based on the image information, which is captured from the VRAM controller 73 at that time, on the liquid-crystal display screen 54 in real time by display according to video signals from the digital video encoder 75.

When there is given a focusing instruction (half-press of the shutter key 58 in this embodiment), the control unit 72 sends a driving control signal to the AF driving unit 61-2, and moves the focus lens in the optical lens system 62 for focusing (AF) operation. When there is given an image forming instruction (full-pressing of the shutter key 58 in this embodiment), capturing is executed (that is, a path from the CCD 63 to the DMA 71 is immediately interrupted at this point, and switching is made to a CCD drive method for the image capturing different from the method used for acquiring a through-image), and the processing is changed to a recording and reserving state.

In the recording and reserving state, the control unit 72 reads out the luminance signal and the color difference signal for one frame, which are stored in the DRAM 71, through the DRAM interface 70 for each component of Y, Cb, and Cr in units, which are named basic blocks, of eight pixels in the vertical direction×eight pixels in the horizontal direction, and supplies the above signals to a joint photograph coding experts group (JPEG) circuit 77 for data compression in the JPEG circuit 77 by processing such as adaptive discrete cosine transforming (ADCT) and Huffman coding, that is, entropy coding.

Then, the obtained coded data is read out from the JPEG circuit 77, and is recorded in the storage memory 78, which is a recording medium in the digital camera 50, as a data file of one image. The control unit 72 reconnects the path from the CCD 63 to the DRAM 71 along with compression processing of the luminance signal and the color difference signal for one frame, and with completion in writing of the compressed data into the storage memory 78.

Moreover, at reproduction mode which is a basic mode, the control unit 72 selectively reads out image data recorded in the storage memory 78, and the compressed image data is expanded in the JPEG circuit 77 according to an inverse procedure to that of data compression at image capturing mode. Then, the expanded image data is stored in the VRAM 74 after developing through the VRAM controller 73, the image data is regularly read out from this VRAM 74, and, based on these pieces of image data, a video signal is generated to output (=display) a reproduction image on the liquid-crystal display screen 54 in the operation unit 76.

The key input device 80 has the above-described mode dial 53, the cursor key 55, the set key 56, the zoom lever 57, the shutter key 58, the power supply button 59, the key for setting a stroboscopic light-emitting mode 60 and the like, and signals according to operations of the above keys are directly sent out to the control unit 72.

The mode dial 53 switches the recording mode (capturing mode) and the reproduction mode. The cursor key 55 is operated for pointing with a cursor on menus, icons, and the like, which are displayed on the liquid-crystal display screen 54 at mode setting, menu selection and the like.

Moreover, the set key 56 is pressed when an item under cursor display with the cursor key 55 is selected for setting or confirming.

The zoom lever 57 is used for zooming operation, and a zoom value is determined according to operations of the zoom lever 57 in the case of digital zooming, but an actual angle of view is not changed, and an image with a size corresponding to the zoom value after trimming is displayed on the liquid-crystal display screen 54. Furthermore, in the case of optical zooming, the zoom lens (variable-focal-length lens) is moved to the wide-angle side or the telephoto side according to operations of the zoom lever 57, a zoom value is determined according to operations of the zoom lever 57, the angle of view is actually changed in accordance with the change of zoom values, and a wide-angle image or a telephoto image is displayed on the liquid-crystal display screen. Here, this embodiment will be explained, assuming that a digital zooming function is not included, and only an optical zooming function is included. But, the present invention can be applied to a digital camera provided with the digital zoom function.

The shutter key 58 operates release processing at capturing, and has a two-stage stroke function. At a first stage (half-press state), a focusing instruction signal is generated in order to execute automatic focusing (AF), automatic exposure (AE), and automatic white balance (AWB); and at a second stage (full-pressing state), a capturing instruction signal is generated in order to execute capturing operation. Here, in this embodiment, when the shutter key 58 is fully pressed at one stroke (hereinafter, pressed at one stroke), focusing operation which is started by the first stage operation is switched to a simple focusing operation. When this simple focusing operation is completed, capturing processing is executed to store image data, which has been obtained by this capturing processing, in the RAM.

Here, there may be adopted a configuration in which two-stage operation can be performed by installing a touch sensor function in the shutter key 58, that is, the shutter key is operated for a case in which a user touches the shutter key 58, and for a case in which the shutter key is pressed. In this case, when the shutter key 58 is touched, the control unit 72 executes half-press processing, assuming that half-press operation is given. When the shutter key 58 is pressed, the control unit 72 performs full-press operation, assuming that full-pressing operation is given.

The key for setting a stroboscopic light-emitting mode 60 has a structure of switching by pushing down, that is, a configuration in which rotational selection of "forced stroboscopic light-emitting mode", "automatic flash mode", "light-emitting inhibiting mode", and the like is executed according to the pushing-down numbers (initial setting is "light-emitting inhibiting mode"). Here, the key for setting a stroboscopic light-emitting mode 60 has light emitting diodes (LEDs), and according to light-emitting modes, for example, switching-on of a red light (forced stroboscopic light-emitting mode), that of a blue light (automatic flash mode), switching-off (light-emitting inhibiting mode), and the like are executed.

The flash driving unit 81 executes charging for a flash light (not shown), or switching-on of the flash light according to the light-emitting modes set by operating the key for setting a stroboscopic light-emitting mode 60 under control of the control unit 72, wherein the flash light is provided inside the stroboscopic light-emitting window 51 on the front of the main body.

Figure 16:
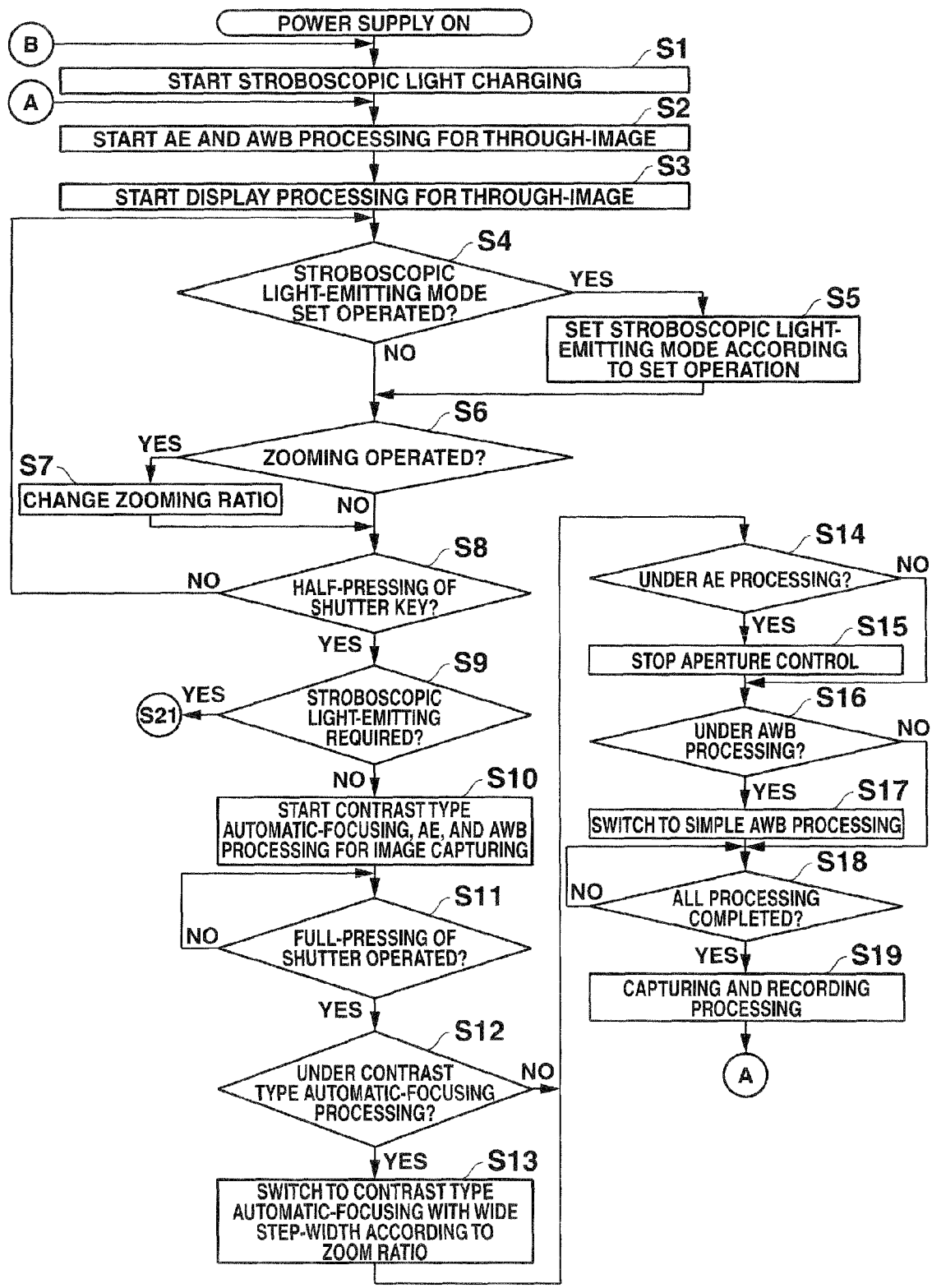
FIG. 16 is a flowchart showing one example of one-stroke determination of the shutter key and capturing operations in the digital camera according to the third embodiment.

FIG. 16 is a flowchart showing one example of determining for one stroke pressing and capturing operation of the shutter key 58 in the digital camera 50. This flowchart explains a program for realizing a function, by which the shutter is quickly fired, according to the embodiment of the present invention in the digital camera 50.

An example in which the control unit 72 basically executes the following processing according to programs which are stored in a program memory such as a flash memory beforehand will be explained. However, not all the functions are required to be stored in a program memory, and there may be adopted a configuration in which a part of or all of programs are received through a network, if necessary, for executing the following processing. Hereinafter, explanation will be made with reference to FIGS. 14A to 14C and 15.

When the main power supply of the digital camera 50 is turned into the ON state, the control unit 72 sends a control signal to the flash driving unit 81 to start charging for the flash light (step S1). Subsequently, AE processing for a through-image is executed by using a focal length corresponding to a zoom value at the time, and a through-image is obtained from the CCD 63. At the same time, after adjustment is made in the color processing circuit 68 in such a way that white balance is made in accordance with the color of the light source by automatic white balance (AWB) processing (step S2), DMA transfer to the DRAM 71 through the DMA controller 69 and the DRAM interface (I/F) 70 is started. In addition, the VRAM 74 is rewritten by using video through-image data in which the image data from the CCD 63 is sampled, and a through-image is started to be displayed on the liquid-crystal display screen 54 in the display device 76 (step S3).

When the control unit 72 examines a signal from the key input device 80 (step S4), and the stroboscopic light-emitting setting key 10-2 is operated, the processing proceeds to step S5, and when not pressed, the processing proceeds to step S6. When the stroboscopic light-emitting setting key 10-2 is operated in step S4, stroboscopic light-emitting mode according to a set operation is set, a set value is kept in the RAM (step S5), and the processing proceeds to step S6.

When the control unit 72 examines a signal from the key input device 80, determines whether or not zooming operation with the zoom lever 57 is executed (step S6), and the zooming operation is performed, the processing proceeds to step S7, and when not performed, the processing proceeds to step S8. When the zooming operation is done in step S6, a zoom value corresponding to the zooming operation is acquired, and an optical zoom ratio is changed by driving the zoom driving unit 61-1 based on this zoom value to move the zoom lens (step S7). At the same time, the zoom value is stored into the RAM (overwritten), and the processing proceeds to step S8.

Subsequently, the control unit 72 examines a signal from the key input device 80, and determines whether or not the shutter key 58 is half pressed (step S8). When the shutter key is half pressed, the processing proceeds to step S9, and when not half pressed, the processing returns to step S4.

When the shutter key 58 is half pressed in step S8, the control unit 72 determines the stroboscopic light-emitting mode set in step S5 (step S9). When it is determined that the surrounding brightness is equal to or smaller than a predetermined threshold under a state in which the forced stroboscopic light-emitting mode is set, or in which the automatic flash mode is set, that is, when stroboscopic light-emitting is required, the processing is shifted to stroboscopic light capturing shown in the flowchart of FIG. 18. When not required, the processing proceeds to step S10.

When it is determined in step S9 that stroboscopic light-emitting is not required, the control unit 72 starts the AF processing of the contrast detection type with a narrow step width for the image capturing, and, at the same time, starts AE processing and automatic white balance (AWB) processing for the image capturing, based on the video through-image data captured at half pressing of the shutter key (step S10). Under the above operations, the VRAM 74 is rewritten until the shutter key 58 is fully pressed by using video through-image data in which the image data from the CCD 63 is sampled, and a through-image is displayed on the liquid-crystal display screen 54 in the display device 76. In ordinary AF processing of the contrast detection type, the AF driving unit 61-2 moves the focus lens with uniform step intervals, the focus lens is temporarily stopped in each step to change the focus position from infinite distance to this side, and contrast values are acquired and compared. Finally, the focus lens is moved, assuming that a position at which the contrast value becomes the maximum is a focused position (step S10).

Next, the control unit 72 examines the signal from the key input device 80 to determine whether or not the shutter key is fully pressed, and when the shutter key 58 is fully pressed, the processing proceeds to step S12 (step S11).

The control unit 72 determines whether or not the AF processing of the contrast detection type is underway (step S12), when the AF processing is underway, the processing proceeds to step S13, and when not underway, the processing proceeds to step S14.

Figures 17A, 17B:
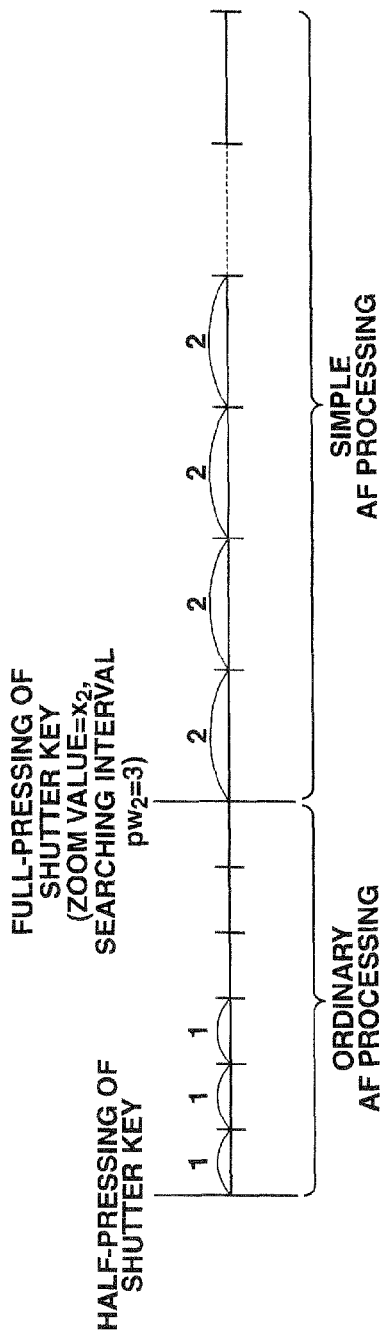
FIGS. 17A and 17B are views each explaining a corresponding table for simple AF processing, in which the zoom values and the search intervals are correlated with one another.

In AF processing of the contrast detection type (ordinary AF processing) for the image capturing, image data processing (capturing processing, contrast extraction processing, contrast comparison processing), and driving control of the lens unit (moving, stopping of moving, and restarting of moving) are required for every one step before determining a focused position. Further, there is required time between time at which a camera user catches a subject in a finder and time at which the subject is in focus and a shutter button is fully pressed for image capturing. Accordingly, when the shutter key 58 is pressed at one stroke, simple AF processing with wide search intervals is configured to be executed as shown in FIG. 17B. That is, when it is determined that AF processing is underway in step S12, the control unit 72 switches the processing to simple AF processing of the contrast detection type with step widths wider than those of ordinary AF processing of the contrast detection type, which is started by half pressing of the shutter key 58, and the simple AF processing of the contrast detection type is executed, following the ordinary AF processing of the contrast detection type.

In that case, referring to a corresponding table for simple AF processing (a corresponding table 90 between zoom values and search intervals) as shown in FIG. 17A, the processing is switched to the simple AF processing of the contrast detection type with wide step widths corresponding to the zoom values after the expression "full-pressing of the shutter key" shown in FIG. 17B. Here, FIG. 17B is a view showing focus positions at which the focus lens is temporarily stopped, and shows that moving of the focus lens is started in order to execute ordinary AF processing of the contrast detection type from the end of the lens by half pressing of the shutter key 58, and the processing is switched to moving of the focus lens in order to execute simple AF processing of the contrast detection type from a position of the focus lens, at which the full-press of the shutter key 58 is detected. In the example shown in FIGS. 17A and 17B, the search interval $pw_2=3$ is obtained from FIG. 17A in the simple AF processing, assuming that a zoom value=$x_2$ when the shutter key 58 is fully pressed, and the focus lens is moved by three steps after a point at which the shutter key 58 is fully pressed. Accordingly, the number of temporary stops of the focus lens becomes one thirds in the example shown in FIGS. 17A and 17B when switching is made to the simple AF processing, so that the moving time of the focus lens is shortened, and the focusing time is shortened. That is, even if the moving range of the focus lens is the same between the ordinary AF processing and the simple AF processing the simple AF processing has the smaller number of temporary stops of the focus lens (driving time of the focus lens), that of capturing operations, that of acquiring the contrast data, and that of contrast data comparing. Accordingly, the time between the operation of the shutter key 58 and that of capturing becomes shorter as a whole by combining the ordinary AF processing and the simple AF processing (step S13).

Moreover, the control unit 72 determines whether or not the AE processing for the image capturing, which is started in step S10, is underway, the processing proceeds to step S15 when the AE processing is underway, and the processing proceeds to step S16 when the AE processing is not underway (step S14).

The time lag at the shutter is affected not only by AF processing, but also by AE processing. Therefore, switching is made to the simple AE processing when the shutter key 58 is fully pressed before the AE processing started by half pressing of the shutter key 58 is completed, that is, when the shutter key 58 is pressed at one stroke. Then, when it is determined in step S14 that the AE processing is underway, the control unit 72 stops aperture control, which is one of AE processing, and subsequently, the processing proceeds to step S16. Thereby, the amount of AE processing is reduced, and the AE processing time is shortened. There may be adopted a configuration, as one modified example, in which the aperture control is not stopped, but for example, omitting time-consuming operations is performed as simple AE processing (step S15).

Furthermore, the control unit 72 determines whether or not the automatic white balance (AWB) for the image capturing started in step S10 is underway, the processing proceeds to step S17 when AWB is underway, and the processing proceeds to step S18 when AWB is not underway (step S16).

The time lag at the shutter is effected not only by AF processing and AE processing, but also by AWB processing. Therefore, switching is made to the simple AWB processing when the shutter key 58 is fully pressed before the AWB processing started by half pressing of the shutter key 58 is completed, that is, when the shutter key 58 is pressed at one stroke. Then, when it is determined that the AWB processing is underway in step S16, the processing proceeds to step S18 after switching is made to the simple AWB processing by the control unit 72. Thereby, the amount of AWB operation is reduced, and the AWB operation time is shortened. Here, the white balance (WB) value of a suitable pattern which has been selected from, ordinarily, about seven patterns is used in the AWB processing. However, the WB value of a suitable pattern which has been selected from, for example, about three typical patterns is used in simple AWB processing (step S17).

The control unit 72 determines whether or not all the processing, that is, processing in steps S10, S13, or S17, that is, all the processing of the AF processing, the AE processing, and the AWB processing are completed. The processing proceeds to step S19 when completed, and the completion is waited when not completed (step S18). Immediately after all the processing is completed, the path from CCD 63 to the DRAM 71 is interrupted at this point and switching is made to a CCD drive method for the image capturing different from the method used for acquiring a through-image. After image compressing processing of the captured image data, this compressed image data (image file) is recorded to complete capturing of the image for one frame, and the processing returns to step S2 (step S19).

FIGS. 17A and 17B are views each explaining the corresponding table 90 for simple AF processing, in which the zoom values referred by the image-forming program and the search intervals of the focus lens are associated. The FIG. 17A is a configuration example for the corresponding table 90, and FIG. 17B is a view explaining the simple AF processing using the corresponding table 90.

In the corresponding table 90, zoom values $x_1, x_2, \ldots, x_n$ are set from the telephoto side to the wide-angle side, and each of the zoom values is corresponding, as shown in FIG. 17A, to the search intervals $pw_1, pw_2, \ldots$ for simple AF processing, respectively. In ordinary AF processing (the first AF processing), the search intervals are the same as one another as shown in FIG. 17B. However, the simple AF processing (the second AF processing) has a configuration in which step widths are different from one another according to the zoom values, and the moving width (step width) of the focus lens when the zoom lens is at the telephoto side is shorter than step width when the focus lens is at the wide-angle side.

The search intervals of the corresponding table 90 are set according to the zoom values, in such a way that the search interval $pw_1$ is set two steps when the zoom value is $x_1$, and the search interval $pw_2$ is set three steps when the zoom value is $x_2$, for example, assuming that the telephoto side is set on the left, and the wide angle side is set on the light in FIG. 17A. Accordingly, the stopping number is reduced in such a way that the stopping number of the focus lens when the zoom value is $x_1$ is half the ordinary AF processing, and the stopping number of the focus lens when the zoom value is $x_3$ is one third the ordinary AF processing, . . . . Therefore, the lens moving time is shortened, and furthermore, time for acquiring contrast values, time for comparing contrast values, capturing time are shortened. As a whole, time between full-press of the shutter key 58 and capturing is shortened in the simple AF processing in which the corresponding table 90 setting the search intervals as shown in FIGS. 17A and 17B.

It is assumed in this example that such point data for focusing every zoom steps is stored as table constants and the like in the program storage memory, and is referred to at operation of the image-forming program shown in the flowchart, and the like of FIG. 16. Here, there may be adopted a configuration in which the point data is set in the storage memory 78, and is referred to by the image-capturing program.

Capturing with Strobe Light

Figure 18:
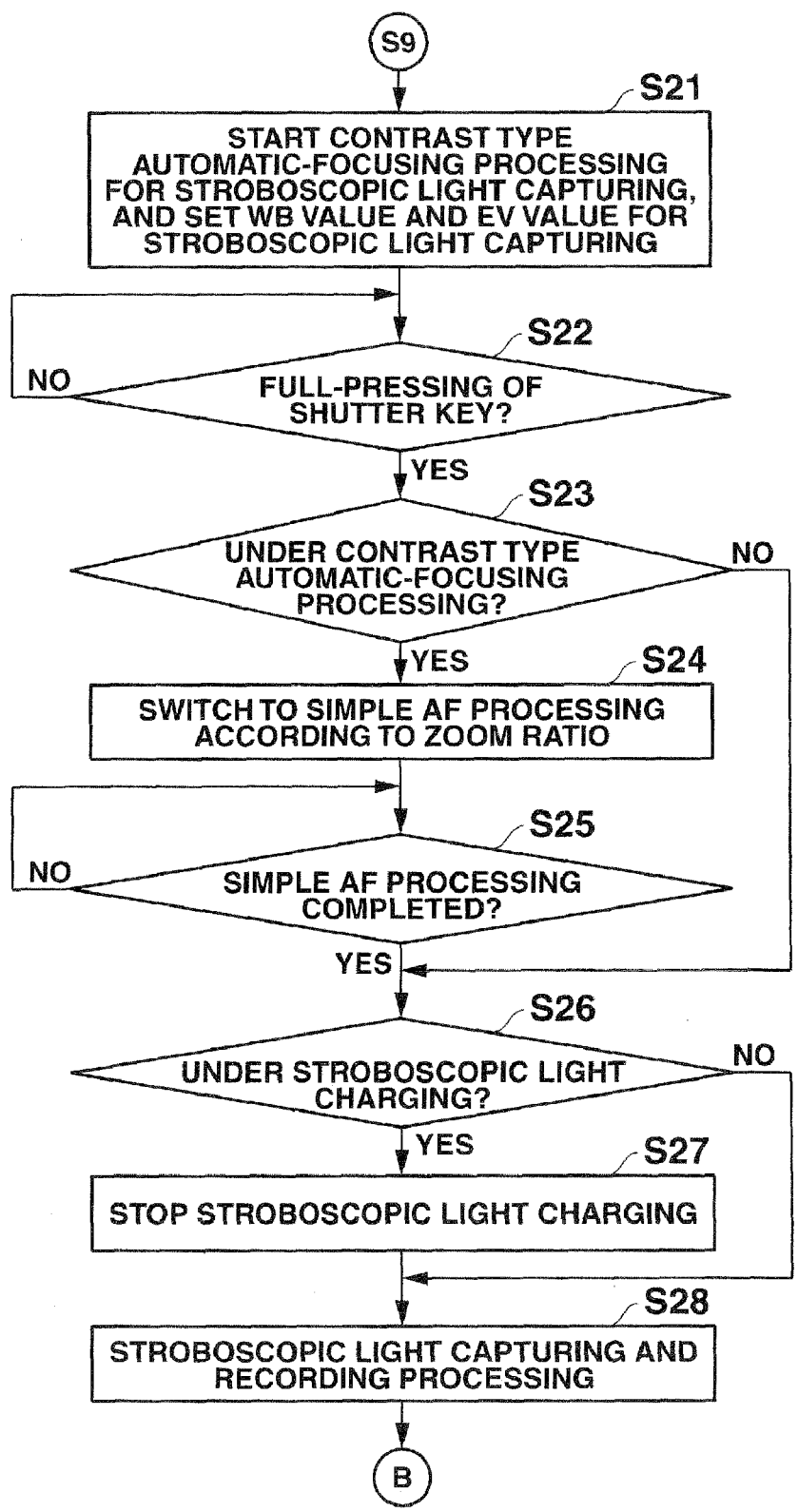
FIG. 18 is a flowchart showing one example of one-stroke determination of the shutter key and capturing operations in the digital camera according to the third embodiment when a forced stroboscopic light-emitting mode (or automatic flash mode) is selected.

FIG. 18 is a flowchart showing one example for determination of one-stroke pressing of the shutter key 58 and capturing in the digital camera 50 when the forced stroboscopic light-emitting mode (or when it is determined that the stroboscopic light-emitting is required in the automatic flash mode) is selected. The drawing shows one example of the capturing operation of the digital camera 50 when it is determined that stroboscopic light-emitting is required in determination processing in step S9 of the flowchart shown in FIG. 16.

When it is determined that the stroboscopic light-emitting is required in step S9 in the flowchart of FIG. 16, the control unit 72 starts the AF processing of the contrast detection type for the stroboscopic light capturing processing, and, at the same time, WB (white balance) values and exposure (EV) values for stroboscopic light capturing are set (step S21). Under the above operations, the through-image is displayed on the liquid-crystal display screen 54 until the shutter key 58 is fully pressed.

Next, the control unit 72 examines the signal from the key input device 80 to determine whether or not the shutter key 58 is fully pressed (step S22), and when the shutter key 58 is fully pressed, the processing proceeds to step S23.

The control unit 72 determines whether or not the AF processing of the contrast detection type is underway (step S23). The processing proceeds to step S24 when the AF processing is underway, and the processing proceeds to step S26 when not underway.

Since the time lag at the shutter is affected by AF processing, switching is made to the simple AF processing when the shutter key 58 is fully pressed before the AF processing started by half pressing of the shutter key 58 is completed, that is, when the shutter key 58 is pressed at one stroke. Then, the processing proceeds to step S25 after the control unit 72 switches the AF processing under execution to the simple AF processing in which the corresponding table 90 for simple AF processing shown in FIG. 17A is referred to when it is determined that AF processing is underway in step S23 (step S24).

The control unit 72 determines whether or not the simple AF processing is completed, and the processing proceeds to step S26 (step S25) when the simple AF processing is completed. Then, it is determined whether or not charging for the flash light is underway (step S26). The processing proceeds to step S27 when underway, and the processing proceeds to step S28 when not underway.

Since not only AF processing, but also stroboscopic light charging is also one of factors for longer time lag in the shutter, capturing is configured to be performed based on shutter-priority operation when the shutter key 58 is fully pressed under stroboscopic light charging. Then, the control unit 72 stops the stroboscopic light charging (step S27) when it is determined in step S26 that the stroboscopic light charging is underway, and the flash light is emitted by controlling the flash driving unit 81. At that time, the path from the CCD 63 to the DRAM 71 is immediately interrupted at that time, and switching is made to a CCD drive method for the image capturing different from the method used for acquiring a through-image. After image compressing processing of the captured image data, this compressed image data (image file) is recorded to complete capturing of the image for one frame (step S28), and the processing returns to step S1 of FIG. 16. Here, when the flash light charge is stopped in step S27, light emitting of the flash light is realized with a light-emitting amount within a capacity under charging in step S28.

When the shutter key 58 is half pressed by operations shown in the flowchart of FIG. 16, the AF processing, the AE processing, the AWB processing are started. When the shutter key 58 is fully pressed under half pressing, the AF processing, the AE processing, and the AWB processing are switched to the simple AF processing, the AE processing, and the AWB processing. Accordingly, the processing time can be shortened, and time between a point at which the shutter key 58 is fully pressed and the image capturing can be shortened. Consequently, miss-releasing of the shutter, and generation of the time lag can be prevented. An image with good focusing accuracy can be obtained with right-time firing of the shutter and without generating time lag. Moreover, since capturing is performed without eliminating the AF processing even if the shutter key 58 is fully pressed, an image with good focusing accuracy can be captured without using a lens with a certain degree of deep depth-of-field.

The time lag at the shutter is effected by, for example, AF processing, so that the processing is executed based on shutter priority operation even under the AF processing when the shutter key 58 is pressed at one stroke. Accordingly, the focusing accuracy is more improved by capturing according to the simple AF processing (refer to step S13) in comparison with a case in which capturing is made under stopping the AF processing, and the AF time can be more extremely shortened in comparison with a case in which capturing is made after completing the AF processing.

Moreover, the time lag at the shutter is affected by AE processing. Therefore, when the shutter key 58 is pressed at one stroke, the processing is executed based on shutter priority operation. The AE processing is performed at any moment during preparation operation for capturing even in a configuration in which the simple AE processing is performed for capturing, following normal AE operations (refer to step S15). Accordingly, opportunity for wrong exposure is reduced at actual capturing, different from focusing operation in which AF processing is performed for the first time at half pressing of the shutter key 58. Moreover, post correction can be easily realized by using a program for a retouched photo, and the like even if capturing is made with insufficient AE processing (under or over exposure).

Moreover, since the time lag at the shutter is affected by AWB processing, so that, when the shutter key 58 is pressed at one stroke, the processing is executed based on shutter priority operation. The AWB processing is performed at any moment during preparation operation for capturing even in a configuration in which the simple AWB processing is performed for capturing, following normal AWB operations (refer to step S17). Accordingly, opportunity for wrong determination is reduced. Moreover, post correction can be easily realized by using a program for a retouched photo, and the like even if capturing is made with incorrect AWB processing (wrong coloration).

Furthermore, according to operations shown in the flowchart of FIG. 18, charging for flash light is stopped in the digital camera 50 when the shutter key 58 is fully pressed. For this reason, time between a point at which the shutter key 58 is fully pressed and stroboscopic light capturing is made shorter, so that capturing can be made with right-time firing of the shutter and without generating time lag.

Modified Examples of the Third Embodiment

According to the flowchart shown in FIGS. 16 and 18, switching is made to the simple processing under a determining condition for one-stroke pressing that, when the shutter key 58 is fully pressed under a state in which AF processing is underway after half pressing of the shutter key 58, that is, when the shutter key 58 is fully pressed, the processing is under AF processing, under AE processing, and under AWB processing. But, a method for pressing of the shutter key 58 at one stroke is not limited to the above method. Hereinafter, a modified example of determination for one stroke pressing of the shutter key 58 will be described.

Figure 19:
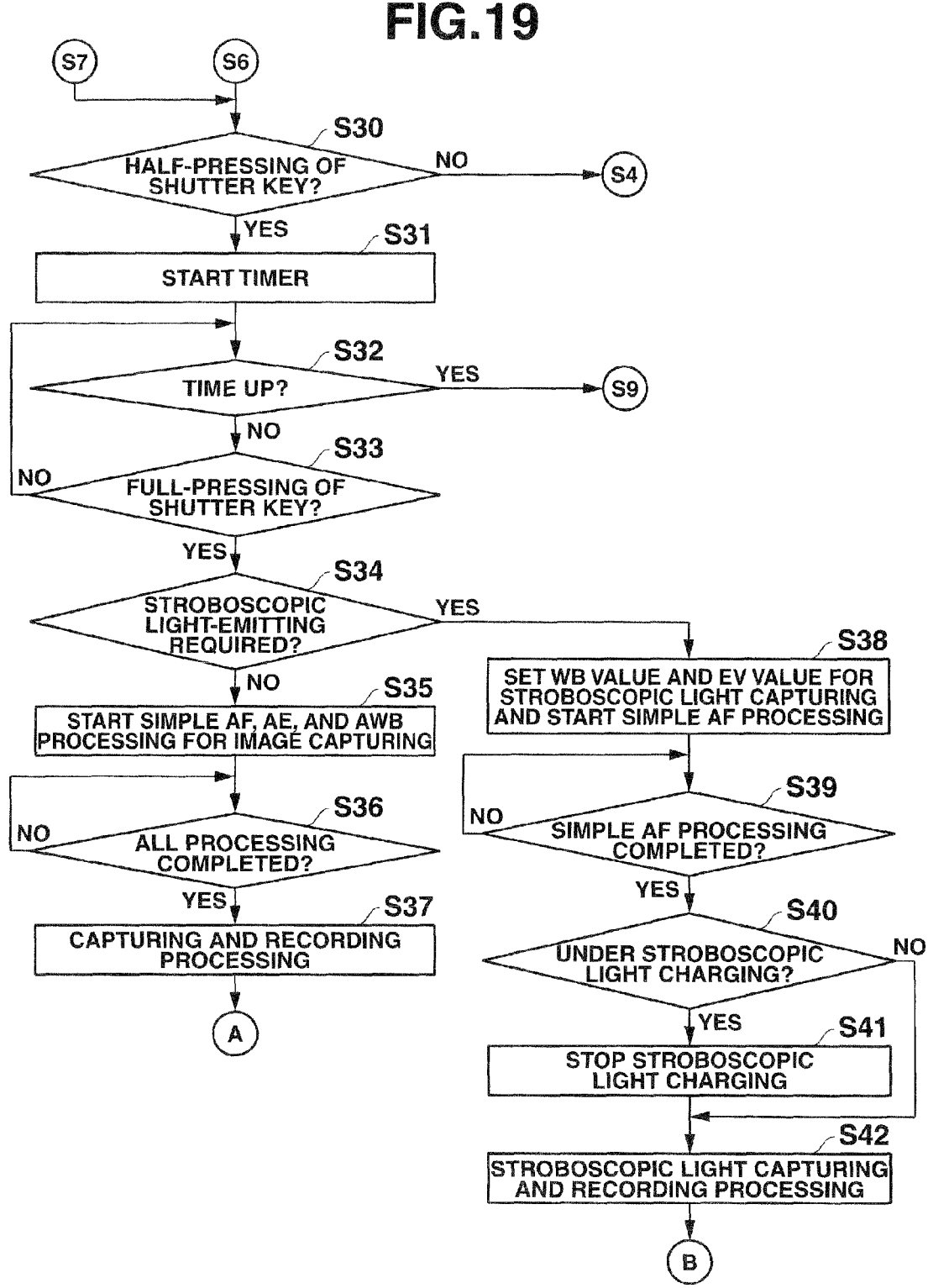
FIG. 19 is a flowchart showing a modified example of one-stroke determination of the shutter key and capturing operations in the digital camera according to the third embodiment.

FIG. 19 is a flowchart showing a modified example for determination of one-stroke pressing of the shutter key 58 and capturing in the digital camera. The modified example has a configuration in which half-press operation is not started unless the half-press of the shutter key 58 is kept for a predetermined time or longer, and steps after step S8 in the flowchart shown in FIG. 16 are changed to steps S30 through S42 as shown in FIG. 19. According to step S30 through step S33 in FIG. 19, it is determined that, when the shutter key 58 is fully pressed within a predetermined time after the shutter key is half pressed, the shutter key 58 is pressed at one stroke, and the processing is shifted to simple processing based on steps S34 through S42.

In FIG. 19, when zooming operation is not performed in step S6 in FIG. 16, or when the zooming ratio is changed according to zooming operations in step S7 in FIG. 16, the control unit 72 determines, based on a signal from the key input device 80, whether or not the shutter key 58 has been half pressed (step S30). When the shutter key 58 has been half pressed, the processing proceeds to step S31, and when not half pressed, the processing returns to step S4 in the flowchart of FIG. 16.

The control unit 72 starts a measuring timer for shutter operating time after zero clearance of the timer (step S31). When time is up, that is, when a predetermined time has passed (full-pressing is not performed within a predetermined time after half pressing is done) (Yes in step S32), it is determined that a user has intended to perform half pressing operation, and the processing proceeds to step S9 in the flowchart of FIG. 16 to start half pressing (S10 through S19, or S21 through S28). When the time is within the predetermined time (No in step S32), the processing proceeds to step S33.

Then, the control unit 72 examines the signal from the key input device 80 to determine whether or not the shutter key 58 is fully pressed (step S33), and when the shutter key 58 is fully pressed, the processing proceeds to step S34. When the shutter key 58 is not fully pressed, the processing returns to step S32.

When the shutter key 58 is pressed at one stroke during steps S31 through S33 (full-pressing is performed within the predetermined time after half pressing is done), the control unit 72 examines the stroboscopic light-emitting mode set in step S5 in the flowchart of FIG. 16 (step S34). In the case of a mode in which the forced stroboscopic light-emitting mode, or the stroboscopic light-emitting mode is required (Yes in step S34), the processing proceeds to step S38, and in the case of a mode in which the forced stroboscopic light-emitting mode, or the stroboscopic light-emitting mode is not required (No in step S34), the processing proceeds to step S35.

When it is determined that the stroboscopic light-emitting is not required in step S34, the control unit 72 starts simple AF processing of the contrast detection type (for example, AF processing by referring to the corresponding table 90 for simple AF processing as shown in FIG. 17A) for the image capturing (step S35). At the same time, AE processing and automatic white balance (AWB) processing are started based on the video through-image data captured at half pressing of the shutter key 58.

The control unit 72 determines whether or not all the processing, that is, the simple AF processing, the AE processing, and the AWB processing, which have started in step S35, are completed (step S36). The processing proceeds to step S37 when completed, and the completion is waited when not completed. When all the processing is completed, the path from the CCD 63 to the DRAM 71 is immediately interrupted at that time, and switching is made to a CCD drive method for the image capturing different from the method used for acquiring a through-image. After image compressing processing of the captured image data, this compressed image data (image file) is recorded to complete capturing of the image for one frame, and the processing returns to step S2 (step S37).

When it is determined in step S34 that the stroboscopic light-emitting is required, the control unit 72 starts the above-described simple AF processing after setting WB (white balance) values and exposure (EV) values for stroboscopic light capturing (step S38).

The control unit 72 determines whether or not the simple AF processing is completed (step S39). The processing proceeds to step S40 when the simple AF processing is completed. Then, it is determined whether or not charging for the flash light is underway (step S40). The processing proceeds to step S41 when underway, and when not underway, the processing proceeds to step S42.

The control unit 72 stops the stroboscopic light charging (step S41) when it is determined in step S40 that the stroboscopic light charging is underway. The flash light is emitted within the allowable capacity for the strobe light at the current time (step S42). At the same time, the path from the CCD 63 to the DRAM 71 is immediately interrupted at that time, and switching is made to a CCD drive method for the image capturing different from the method used for capturing a through-image. After image compressing processing of the captured image data, this compressed image data (image file) is recorded to complete capturing of the image for one frame, and the processing returns to step S1.

According to operations shown in the flowchart of FIG. 19, it is determined that the shutter key 58 is pressed at one stroke when the shutter key 58 is fully pressed within a predetermined time after the shutter key 58 is half pressed, and capturing for the image capturing is executed according to simple AF processing, AE processing, and AWB processing. Accordingly, the time between a point at which the shutter key 58 is pressed at one stroke and the image capturing can be shortened to extremely shorter one, and an image with good focusing accuracy can be obtained with right-time firing of the shutter and without generating time lag. Moreover, when the stroboscopic light capturing is required, the stroboscopic light charging is stopped for the stroboscopic light capturing. Accordingly, the time between a point at which the shutter key is pressed at one stroke and the image capturing can be shortened to extremely shorter one, and the similar advantages to those of the above-described example can be obtained.

In the above described modified example, it has been determined that, when the shutter key 58 is fully pressed within a predetermined time after the shutter key 58 is half pressed, the shutter key 58 is pressed at one stroke, a method for determining the one-stroke pressing of the shutter key is not limited to the above one. There may be adopted a configuration in which half-press operation is not started unless the half-press of the shutter key 58 is kept for equal to or longer than predetermined time. That is, there may be adopted a configuration in which, when it is determined in step S30 in FIG. 19 that the shutter key 58 is half pressed, AF processing of the contrast detection type for image capturing, AE processing, and, the AWB processing are executed; and, in the other cases (when the shutter key 58 is not half pressed), it is determined in the case of full-press that the shutter key 58 is pressed at one stroke, and the processing is shifted to processing in steps S33 through S42 in FIG. 19. Even in the above configuration, it is determined that, when the shutter key 58 is fully pressed within a predetermined time after operation of the shutter key 58, the shutter key 58 is pressed at one stroke. Then, capturing for the image capturing is executed according to simple AF processing, AE processing, and AWB processing. Accordingly, the time between a point at which the shutter key 58 is pressed at one stroke and the image capturing can be shortened to extremely shorter one, and the similar advantages to those of the above-described modified example can be obtained.

Moreover, there may be adopted another configuration as follows. That is, by installing a shutter key 58 by which the half-press operation can not be electrically detected (recognized) unless the half-press operation is kept for a predetermined time, and, by repeated determination on whether or not the shutter key 58 is fully pressed, or whether or not the shutter key 58 is half pressed, it is determined that one-stroke pressing is caused when it is determined without determination in which the shutter key is half pressed that the shutter key 58 is fully pressed (that is, when the shutter key 58 is fully pressed at one stroke, and when the shutter key 58 passes through a half-press position for a moment) and, then, the processing is shifted to processing in steps S33 through S42 in FIG. 19. Even in the above configuration, capturing for the image capturing is executed according to simple AF processing, AE processing, and AWB processing. Accordingly, the time between a point at which the shutter key 58 is pressed at one stroke and the image capturing can be shortened to extremely shorter one, and the similar advantages to those of the above-described modified example can be obtained.

Fourth Embodiment

The third embodiment has a configuration in which switching is made to simple processing in such a way that AF processing, AE processing, AWB processing, stroboscopic light-emitting, and the like are easily performed when a shutter key 58 is pressed at one stroke, so that time from the shutter operation to the capturing processing is shortened. However, a method by which time between shutter operation and capturing processing can be shortened is not limited to the examples according to the third embodiment. Hereinafter, examples in which, when the shutter key 58 is pressed at one stroke, AF processing, AE processing, AWB processing, stroboscopic light-emitting, and the like are stopped (or, are not performed), and time between shutter operation and capturing processing can be shortened, will be described. Here, it is assumed in the following explanation that the appearance and an internal configuration of a digital camera are similar to those of the digital camera 50 shown in FIGS. 14A to 14C and 15.

Figure 20:
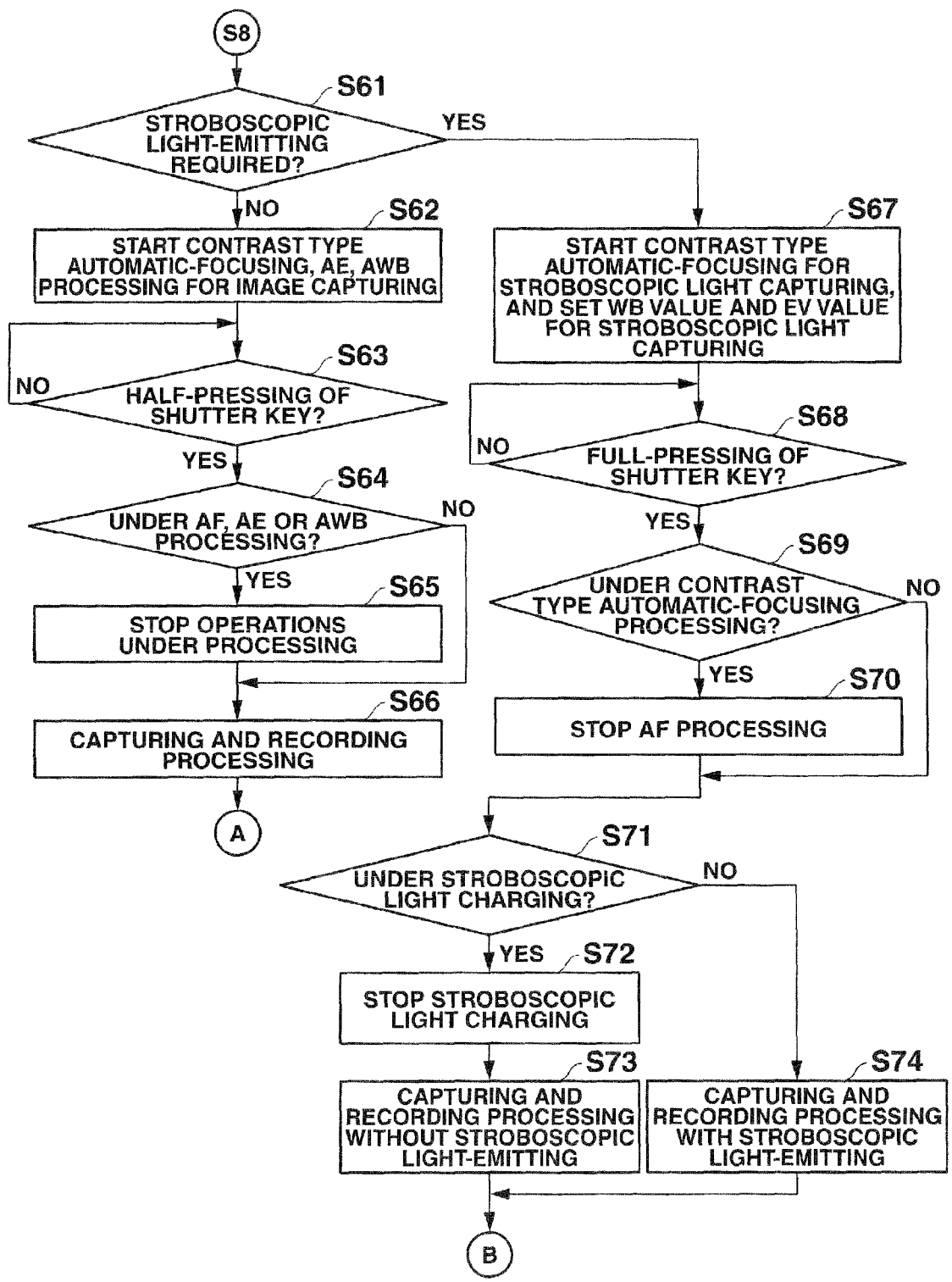
FIG. 20 is a flowchart showing one example of one-stroke determination of the shutter key and capturing operations in the digital camera according to the fourth embodiment.

FIG. 20 is a flowchart showing one example for capturing operation based on one-stroke pressing of the shutter key 58 in the digital camera 50. This flowchart explains a program for realizing a function, by which the shutter is quickly fired, according to the present invention in the digital camera 50.

Examples in which the control unit 72 basically executes the following processing according to programs stored in a program memory such as a flush memory beforehand will be explained. However, there may be adopted a configuration in which all the functions are not required to be stored in the program memory, and a part of or all of the functions are received through a network, as necessary. Hereinafter, explanation will be made, referring to FIGS. 13, 14A to 14C, and 20. Here, processing in steps S1 through S7 in FIG. 20 is similar to that of steps S1 through S7 in FIG. 16.

In FIG. 20, a control unit 72 examines in step S61 stroboscopic light-emitting mode set in step S5 when the shutter key 58 is half pressed in step S8 (FIG. 16). Then, in the case of a mode such as forced stroboscopic light-emitting mode and automatic flash mode requiring stroboscopic light-emitting, the processing proceeds to step S67; and, in the case of another mode with no requirements, the processing proceeds to step S62.

When it is determined that the stroboscopic light-emitting is not required in step S61, the control unit 72 starts AF processing of the contrast detection type for the image capturing, and at the same time, the AE processing and the AWB processing, based on video through-image data captured when the shutter 58 is half pressed (step s62). Under the above operations, the VRAM 74 is rewritten until the shutter key 58 is fully pressed by using video through-image data in which the image data from the CCD 63 is sampled, and a through-image is displayed on the liquid-crystal display screen 54 in the display device 76.

Subsequently, the control unit 72 examines in step S63 the signal from the key input device 80 to determine whether or not the shutter key 58 is fully pressed. When the shutter key 58 is fully pressed, the processing proceeds to step S64.

In step S64, the control unit 72 determines whether or not any one of the AF, the AE or the AWB processing, which have been started in step S62, is still underway (step S64). Then, when no processing is underway, the processing proceeds to step S66, and when any one of the processing is underway, operation under processing is stopped in step S65. In step S66, the path from the CCD 63 to the DRAM 71 is immediately interrupted, and switching is made to a CCD drive method for the image capturing different from the method used for capturing a through-image. After image compressing processing of the captured image data, this compressed image data (image file) is recorded to complete capturing of the image for one frame, and the processing returns to step S2.

Moreover, when it is determined that stroboscopic light-emitting is required in step S61, the control unit 72 starts AF processing of the contrast detection type for stroboscopic light capturing, and, at the same time, WB (white balance) values and exposure (EV) values for stroboscopic light capturing are set (step S67). Under the above operations, a through-image is displayed on the liquid-crystal display screen 54 until the shutter key 58 is fully pressed.

Next, the control unit 72 examines in step S68 the signal from the key input device 80 to determine whether or not the shutter key 58 is fully pressed. When the shutter key 58 is fully pressed, the processing proceeds to step S69.

The control unit 72 determines in step S69 whether or not AF processing of the contrast detection type which has been started in step S67 is underway. When the AF processing is underway, the processing proceeds to step S70, and when not underway, the processing proceeds to step S71.

When it is determined in step S69 that the AF processing is underway, the control unit 72 stops the AF processing (step S70), and the processing proceeds to step S71. Furthermore, it is determined in step S71 whether or not the stroboscopic light charging is underway. When the charging is underway, the processing proceeds to step S72, and when not underway, the processing proceeds to step S74.

When it is determined in step S71 that the stroboscopic light charging is underway, the stroboscopic light charging is stopped (step S72) with no stroboscopic light-emitting. In step S73, the path from the CCD 63 to the DRAM 71 is immediately interrupted, and switching is made to a CCD drive method for the image capturing different from the method used for capturing a through-image. After image compressing processing of the captured image data, this compressed image data (image file) is recorded to complete capturing of the image for one frame, and the processing returns to step S1.

When it is determined in step S71 that the stroboscopic light charging is not underway, the flash light is emitted by controlling the flash driving unit 81 (step S74). At that time, the path from the CCD 63 to the DRAM 71 is immediately interrupted, and switching is made to a CCD drive method for the image capturing different from the method used for capturing a through-image. After image compressing processing of the captured image data, this compressed image data (image file) is recorded to complete capturing of the image for one frame, and the processing returns to step S1.

According to the flowchart of FIG. 20, when the shutter key 58 is half pressed, AF processing, AE processing, AWB processing are started as preparation operation for capturing. When the shutter key is fully pressed during half-press, the preparation operation for capturing under processing is stopped and the capturing operation is started. Accordingly, when the shutter key 58 is fully pressed, image capturing can be performed for a moment. Thereby, an image can be captured with right-time firing of the shutter and without generating time lag. Moreover, since the stroboscopic light charging is stopped for capturing even when stroboscopic light charging is underway, the similar advantages can be obtained.

Modified Example

According to the flowchart shown in FIG. 20, processing under operation is stopped under a determining condition for one-stroke pressing that, when the shutter key 58 is fully pressed under a state in which AF processing is underway after half pressing of the shutter key 58, that is, when the shutter key 58 is fully pressed, the processing is under AF processing, under AE processing, and under a state in which the AWB processing is not completed. But, a method for pressing of the shutter key 58 at one stroke is not limited to the above method, and similar methods for pressing of the shutter key at one stroke to those of the modified example of the third embodiment. Hereinafter, a modified example of determination for one stroke pressing of the shutter key 58 will be described.

Figure 21:
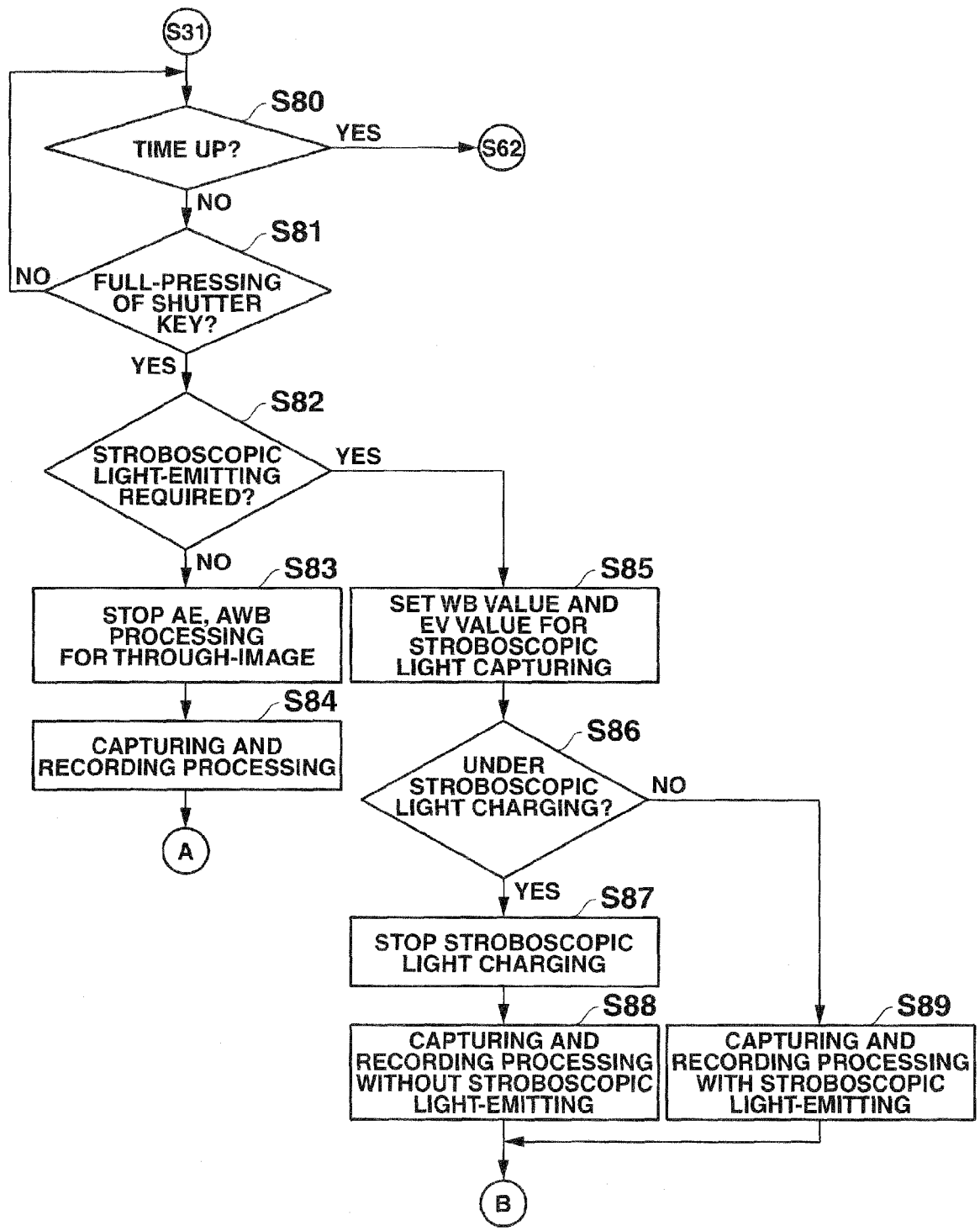
FIG. 21 is a flowchart showing a modified example of one-stroke determination of the shutter key and capturing operations in the digital camera according to the fourth embodiment.

FIG. 21 is a flowchart showing a modified example for determination of one-stroke pressing of the shutter key 58 and capturing in the digital camera. The modified example has a configuration in which half-press operation is not started unless the half-press of the shutter key 58 is kept for equal to or longer than predetermined time, and steps after step S31 in the flowchart shown in FIG. 19 are changed to steps S80 through S89 as shown in FIG. 21. Thereby, when the shutter key 58 is fully pressed within a predetermined time after the shutter key 58 is half pressed in step 30 in FIG. 19, it is determined that the shutter key 58 is pressed at one stroke, and the processing is shifted to processing in steps S82 through S89 processing.

In FIG. 21, a measuring timer for shutter operating time is started after zero clearance of the timer in step S31 in FIG. 19. When time is up (Yes in step S80), that is, when a predetermined time has passed (full-pressing is not performed within a predetermined time after half pressing is done), it is determined that a user has intended to perform half pressing operation, and the processing proceeds to step S61 in the flowchart of FIG. 20 to start half pressing (S61 through S74). When the full-pressing is performed within the predetermined time (No in step S80), the processing proceeds to step S81.

Subsequently, the control unit 72 examines the signal from the key input device 80 to determine whether or not the shutter key 58 is fully pressed (step S81). When the shutter key 58 is fully pressed within the predetermined time, it is determined that the shutter 58 is pressed at one stroke, and the processing proceeds to step S82. When the shutter key 58 is not fully pressed within the predetermined time, the processing returns to step S80.

When the shutter key 58 is pressed at one stroke in steps S80 and S81 (full-pressing is performed within the predetermined time after half pressing is done), the control unit 72 examines in step S82 the stroboscopic light-emitting mode set in step S5 (in the flowchart of FIG. 16). In the case of a mode such as forced stroboscopic light-emitting mode and automatic flash mode requiring stroboscopic light-emitting (Yes in step S82), the processing proceeds to step S85, and in the case of another mode with no requirements (No in step S82), the processing proceeds to step S83.

When it is determined in step S82 that stroboscopic light-emitting is not required, the control unit 72 stops the AE processing and the AWB processing for a through-image (step S83). At that time, the path from the CCD 63 to the DRAM 71 is immediately interrupted, and switching is made to a CCD drive method for the image capturing different from the method used for capturing a through-image. After image compressing processing of the captured image data, this compressed image data (image file) is recorded to complete capturing of the image for one frame (step S84), and the processing returns to step S2 (in the flowchart in FIG. 16).

When it is determined that stroboscopic light-emitting is required in step S82, the control unit 72 sets WB (white balance) values and exposure (EV) values for stroboscopic light capturing (step S85), and it is determined whether or not the stroboscopic light charging is underway (step S85). When the charging is underway, the processing proceeds to step S87, and when not underway, the processing proceeds to step S89.

When it is determined in step S86 that stroboscopic light charging is underway, the stroboscopic light charging is stopped with no stroboscopic light-emitting (step S87). At that time, the path from the CCD 63 to the DRAM 71 is immediately interrupted, and switching is made to a CCD drive method for the image capturing different from the method used for capturing a through-image. After image compressing processing of the captured image data, this compressed image data (image file) is recorded to complete capturing of the image for one frame (step S88), and the processing returns to step S1.

On the other hand, when it is determined in step S86 that stroboscopic light charging is not underway, the flash light is emitted (step S89). At that time, the path from the CCD 63 to the DRAM 71 is immediately interrupted, and switching is made to a CCD drive method for the image capturing different from the method used for capturing a through-image. After image compressing processing of the captured image data, this compressed image data (image file) is recorded to complete capturing of the image for one frame (step S89), and the processing returns to step S1.

According to operations shown in the flowchart of FIG. 21, it is determined that the shutter key 58 is pressed at one stroke when the shutter key 58 is fully pressed within a predetermined time after the shutter key 58 is half pressed, and capturing is executed without executing AF processing, AE processing, and AWB processing for the image capturing. Accordingly, when the shutter key 58 is fully pressed, capturing can be executed for a moment. Thereby, an image can be captured with right-time firing of the shutter and without generating time lag. Moreover, since the stroboscopic light charging is stopped, and capturing is performed without flash light when stroboscopic light charging is underway under a state in which stroboscopic light capturing is required, the similar advantages can be obtained.

In the above-described modified example, it has been determined that, when the shutter key 58 is fully pressed within a predetermined time after the shutter key 58 is half pressed, the shutter key 58 is pressed at one stroke. However, a method for determining the one-stroke pressing of the shutter key is not limited to the above one. There may be adopted a configuration in which half-press operation is not started unless the half-press of the shutter key 58 is kept for equal to or longer than predetermined time. That is, there may be adopted a configuration in which, when it is determined in step S30 in FIG. 19 that the shutter key 58 is half pressed, AF processing of the contrast detection type for image capturing, AE processing, and, the AWB processing are executed; and, in the other cases (when the shutter key 58 is not half pressed), it is determined in the case of full-press that the shutter key 58 is pressed at one stroke, and the processing is shifted to processing in steps S82 through S89 in FIG. 21. Even in the above configuration, it is determined that, when the shutter key 58 is fully pressed within a predetermined time after operation of the shutter key 58, the shutter key 58 is pressed at one stroke, and capturing is executed after AF processing, AE processing, and AWB processing are stopped. Accordingly, time between a point of shutter operation and image capturing can be shortened to extremely shorter one, and the similar advantages to those of the above-described modified example can be obtained.

Moreover, there may be adopted another configuration in which, by installing a shutter key 58 by which the half-press operation can not be electrically detected (recognized) unless the half-press operation is kept for a predetermined time, and, by repeated determination on whether the shutter key 58 is fully pressed or the shutter key 58 is half pressed, it is determined that one-stroke pressing is caused when it is determined without determination in which the shutter key is half pressed that the shutter key 58 is fully pressed (that is, when the shutter key 58 is fully pressed at one stroke, and when the shutter key 58 passes through a half-press position for a moment) and, then, the processing is shifted to processing in steps S33 through S42 in FIG. 19. Even the above configuration, capturing is executed after AF processing, AE processing, and AWB processing are stopped. Accordingly, time between a point of shutter operation and image capturing can be reduced to extremely shorter one, and the similar advantages to those of the above-described modified example can be obtained.

Moreover, the third and fourth embodiments, and the modified examples thereof have a configuration in which AF operation started by half pressing of the shutter key 58 and AF operation started by full-pressing of the shutter key 58 have the same AF search range. But, there may be adopted a configuration in which both the AF operations have different AF search ranges from each other. There may be adopted a configuration, for example, in which, assuming that the AF search range for the AF operation started by half pressing of the shutter key 58 is a first AF search range, and the AF search range for AF operation started by full-pressing of the shutter key 58 is a second AF search range, the second AF search range is narrower than the first AF search range. In the above case, the second AF search range may be configured to arbitrarily be set by manual operation of a user, or a capturing scene is determined based on captured conditions acquired at capturing and contrast values acquired from image data and the an AF search range corresponding to the determined result may be configured to be the second AF search range.

In the explanation for the third and fourth embodiments, the search interval of the focus lens at simple AF processing has been set at a value (a fixed value) which has been set beforehand, according to zoom values as shown in the example of FIG. 17A. But, the search interval of the focus lens may be configured to be set by manual corresponding to the zoom values, or the search interval of the focus lens may be configured to automatically be set corresponding to the zoom values, and based on captured conditions acquired at capturing and contrast values acquired from image data.

Furthermore, the fourth embodiment has a configuration in which all kinds of AF processing such as stopping processing of the focus lens, capturing processing, contrast-data acquisition processing, and contrast-data comparison processing are simplified when the shutter key 58 is fully pressed. But, there may be adopted a configuration in which any one of stopping processing of the focus lens, capturing processing, contrast-data acquisition processing, and contrast-data comparison processing is simplified, for example, only contrast-data comparison processing is simplified, or a configuration in which only the contrast-data comparison processing; only a combination of the contrast-data acquisition processing and the contrast-data comparison processing; only a combination of the capturing processing, the contrast-data acquisition processing, and the contrast-data comparison processing; or a combination of stopping processing of the focus lens, capturing processing, contrast-data acquisition processing, and contrast-data comparison processing is simplified.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the digital camera has been used as a camera in the explanation for examples. The term "camera" can be applied to a cellular telephone with a camera function, information-processing equipment with a camera function, and the like, other than an image capture device such as a digital camera.

What is claimed is:

1. An image capture device comprising:
    an image capture unit configured to capture an image of an object and to output image data;

an exposure value setting unit configured to execute an automatic-exposure process for setting an appropriate exposure value;

a shutter button configured to be half pressable, fully pressable, and pressable at one stroke;

a first determining unit configured to determine whether or not the shutter button is half pressed;

a second determining unit configured to determine whether or not the shutter button is pressed at one stroke;

a first automatic-exposure controller configured to cause the exposure value setting unit to execute a first automatic-exposure process including aperture control when the first determining unit determines that the shutter button is half pressed;

an automatic-exposure stop controller configured to cause the exposure value setting unit to stop the first automatic-exposure process when the second determining unit determines that the shutter button is pressed at one stroke; and a second automatic-exposure controller configured to cause the exposure value setting unit to execute a second automatic-exposure process inhibiting the aperture control, after the first automatic-exposure process is stopped by the automatic-exposure stop controller.

2. An image capture device comprising:

an image capture unit configured to capture an image of an object and to output image data;

an exposure value setting unit configured to execute an automatic-exposure process for setting an appropriate exposure value;

a shutter button configured to be half pressable, fully pressable, and pressable at one stroke;

a first determining unit configured to determine whether or not the shutter button is half pressed;

a second determining unit configured to determine whether or not the shutter button is pressed at one stroke;

an automatic-exposure controller configured to cause the exposure value setting unit to execute the automatic-exposure process when the first determining unit determines that the shutter button is half pressed;

an automatic-exposure stop controller configured to cause the exposure value setting unit to stop the automatic-exposure process when the second determining unit determines that the shutter button is pressed at one stroke; and a recording controller configured to record the image data output from the image capture unit when the automatic-exposure process is stopped by the automatic-exposure stop controller.

3. A computer readable recording medium having stored thereon a computer readable program executable by a computer of an image capture device, wherein the image capture device comprises an image capture unit configured to capture an image of an object and to output image data, and a shutter button configured to be half pressable, fully pressable, and pressable at one stroke, the program being executable by the computer to control the computer to perform functions comprising:

determining whether or not the shutter button is half pressed;

determining whether or not the shutter button is pressed at one stroke;

executing a first automatic-exposure process including aperture control when it is determined that the shutter button is half pressed;

stopping the first automatic-exposure process when it is determined that the shutter button is pressed at one stroke; and executing a second automatic-exposure process inhibiting the aperture control, after the first automatic-exposure process is stopped.

4. A computer readable recording medium having stored thereon a computer readable program executable by a computer of an image capture device, wherein the image capture device comprises an image capture unit configured to capture an image of an object and to output image data, and a shutter button configured to be half pressable, fully pressable, and pressable at one stroke, the program being executable by the computer to control the computer to perform functions comprising:

determining whether or not the shutter button is half pressed;

determining whether or not the shutter button is pressed at one stroke;

executing an automatic-exposure process when it is determined that the shutter button is half pressed;

stopping the automatic-exposure process when it is determined that the shutter button is pressed at one stroke; and recording the image data output from the image capture unit when the automatic-exposure process is stopped.

* * * * *